(12) United States Patent
Johoji et al.

(10) Patent No.: US 6,331,593 B1
(45) Date of Patent: Dec. 18, 2001

(54) RESIN COMPOSITION PELLET

(75) Inventors: Hirofumi Johoji; Toshiyuki Kuwabara, both of Chiba (JP)

(73) Assignee: Sumitomo Chemical Limited., Co., Osaka (JP)

( * ) Notice: Subject to any disclaimer, the term of this patent is extended or adjusted under 35 U.S.C. 154(b) by 0 days.

(21) Appl. No.: 09/330,988

(22) Filed: Jun. 14, 1999

(30) Foreign Application Priority Data

Jun. 17, 1998 (JP) .................................................. 10-169918

(51) Int. Cl.$^7$ .............................. C08F 8/00; C08L 45/00; C08L 23/00; C08L 23/04
(52) U.S. Cl. ......................... 525/191; 525/210; 525/211; 525/240
(58) Field of Search .................................... 525/191, 210, 525/211, 240

(56) References Cited

U.S. PATENT DOCUMENTS 5,854,354 * 12/1998 Ueda et al. ........................ 525/322

FOREIGN PATENT DOCUMENTS 8-302086    11/1996 (JP) .

* cited by examiner

*Primary Examiner*—Nathan M. Nutter
(74) *Attorney, Agent, or Firm*—Fitch, Even, Tabin & Flannery

(57) ABSTRACT

A resin composition pellet comprising:
(i): 15 to 65% by weight of a polyolefin-based resin, and
(ii): 85 to 35% by weight of anolefin-based copolymer obtained by copolymerizing two or more olefins selected from ethylene, propylene and α-olefins having 4 to 20 carbon atoms in the presence of a catalyst for olefin polymerization, the total number of carbon atoms in the selected olefins being 7 or more.

27 Claims, No Drawings

RESIN COMPOSITION PELLET

BACKGROUND OF THE INVENTION

1. Field of the Invention

The present invention relates to a resin composition pellet, a method for producing a resin composition pellet, a modifier for a polyolefin-based resin and a method for producing a polyolefin-based resin composition. More particularly, the present invention relates to a technology which can be used to provide a polyolefin based resin composition that has excellent flexibility and transparency characteristics, exhibits a suppressed (reduced) tendency for pellets to agglomerate (adhere to one another), and thus has excellent handling properties and excellent workability. The present invention relates to a resin composition pellet having the above-described features, a method for producing the resin composition pellet, a modifier for a polyolefin-based resin and a method for producing a polyolefin-based resin composition. When resin composition pellets show a high tendency to adhere to one another, the adhered pellets form lumps during storage. Lump formation is extremely disadvantageous in the subsequent measurement, input operation into a kneader, and the like.

2. Description of the Related Art

Polyolefin-based resins, typically including polypropylene, suffer from defects such as poor flexibility and transparency while having excellent strength and heat resistance. There is known a technology using a flexibility imparting agent for giving flexibility and transparency to polyolefin-based resins. However, according to conventional technologies, a flexibility imparting agent presents significant adhesion problems. It tends to adhere under slight loads and consequently can not in the form of a small shape such as a pellet and the like for a long period of time. Therefore, flexibility imparting agents have problems of extremely poor handling and workability such as in transportation, measurement and the like in compounding into polyolefin-based resins.

SUMMARY OF THE INVENTION

An object of the present invention is to overcome the above-described problems with a production technology so that a polyolefin-based resin composition can be effectively obtained which exhibits excellent flexibility and transparency. More particularly, the present invention provides a resin composition pellet that has excellent non-mutual adhesion (non-agglomerating characters), storability and handling, a method for producing such a resin composition pellet, a modifier for a polyolefin-based resin in the form of a pellet composed of the composition and a method for producing a polyolefin-based resin composition.

The present invention relates to a resin composition pellet comprising:

(i) 15 to 65% by weight of a polyolefin-based resin, and
(ii) 85 to 35% by weight of an olefin-based copolymer obtained by copolymerizing two or more olefins selected from ethylene, propylene and α-olefins having 4 to 20 carbon atoms in the presence of a catalyst for olefin polymerization, the total number of carbon atoms in the selected olefins being 7 or more.

The present invention also relates a method for producing a resin composition pellet, wherein the above-described resin (i) and copolymer (ii) are kneaded at a temperature, which is not less than the maximum peak temperature (Tm), as measured by differential scanning calorimetry (DSC)and not higher than 280° C.

The present invention also relates a polyolefin-based resin modifier comprising the above-described polyolefin-based resin composition pellet.

The present invention also relates to a method for producing a polyolefin-based resin composition comprising compounding the above-described polyolefin-based resin modifier into a polyolefin-based resin.

DETAILED DESCRIPTION OF THE PREFERRED EMBODIMENT

The component (i) in the present invention is a polyolefin-based resin. Examples thereof include high density polyethylene, medium density polyethylene, low density polyethylene, LLDPE (linear low density polyethylene), polypropylene-based resins, poly-4-methylpentene-1 and the like. Polypropylene-based resins are preferred.

A polypropylene-based resin that can be used in the composition of the present invention is a crystalline polypropylene-based resin, and is a homopolymer of propylene, or a random or block copolymer of propylene with a small amount of α-olefin and/or ethylene. If the above-described polypropylene-based resin is a random copolymer, the copolymerization proportion of other α-olefin and/or ethylene in the copolymer is generally 10% by weight or less, preferably from 0.5 to 7% by weight in total. If it is a block copolymer, the copolymerization proportion of other α-olefin and/or ethylene in the copolymer is generally from 1 to 40% by weight, preferably from 1 to 25% by weight, further from 2 to 20% by weight, and particularly preferably from 3 to 15% by weight. These polypropylene-based polymers may be composed of two or more polymers together. As indices of the crystalline property of the polypropylene, melting point, crystal melting calorie and the like are used. For example, it is preferred that the melting point be in the range from 120° C. to 176° C. and the crystal melting calorie be in the range from 60 J/g to 120 J/g. When the melting point of a crystal is too low or the melting calorie thereof is too low, heat resistance of the raw material may consequently decrease.

There are methods that may, in general, be identified for the production of a polyolefin-based resin. There may be generally listed methods in which a propylene homopolymer is obtained by homopolymerizing propylene in a one-step or multi-step process according to slurry polymerization, gas-phase polymerization, bulk polymerization, solution polymerization or a combination thereof There may also be listed methods in which a propylene α-olefin copolymer is obtained by copolymerizing propylene with an α-olefin having 2 or 4 to 12 carbon atoms, preferably ethylene, in a one-step or multi-step process. A polymerization can be catzed using a Ziegler Natta type catalyst, which comprises a titanium-containing solid state transition metal component and an organometallic component, or catalyzed using a metallocene catalyst, which comprises a transition metal compound of from Groups 4A to 6A in the periodic table, which compound has at least one cyclopentadienyl skeleton, in combination with an auxiliary catalyst component. Further, corresponding commercially available products can be used as the component (i).

The component (ii) in the present invention is an olefin-based copolymer obtained by copolymerizing two or more olefins selected from ethylene, propylene and α-olefins having 4 to 20 carbon atoms in the presence of a catalyst for olefin polymerization, wherein the total number of carbon atoms in the selected olefins is at least 7. It is necessary that the total number of carbon atoms in the selected olefins is 7 or more. If the total number of carbon atoms in the selected olefins is less than 7, a molded article obtained by using the resulting polyolefin-based resin composition exhibits poor flexibility and transparency.

The α-olefins having 4 to 20 carbon atoms include linear and branched α-olefins. Specific examples of linear α-olefins include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nanodecene, 1-eicosene and the like. Specific examples of branched α-olefins include 3-methyl-1-butene, 3-methyl-1-pentene, 4-methyl-1-pentene, 2-ethyl-1-hexene, 2,2,4-trimethyl-1-pentene and the like.

Specific examples of combinations of two or more selected olefins include ethylene/1-pentene, ethylene/1-hexene, ethylene/1-octene, ethylene/1-decene, ethylene/1-octadecene, ethylene/4-methyl/1-pentene, propylene/1-butene, propylene/1-pentene, propylene/1-hexene, propylene/i-octene, propylene/1-decene, propylene/i-octadecene, propylene/4-methyl-1-pentene, 1-butene/1-pentene, 1-butene/1-hexene, 1-butene/1-octene, 1-butene/1-decene, 1-butene/1-octadecene, 1-butene/4-methyl-1-pentene, 1-hexene/1-octene, 1-hexene/1-decene, 1-hexene/1-octadecene, 1-hexene/4-methyl-1-pentene, 1-octene/1-decene, 1-octene/1-octadecene, 1-octene/4-methyl-1-pentene, 1-decene/1-octadecene, 1-decene/4methyl-1-pentene, 1-octadecene/4methyl-1-pentene, ethylene/propylene/1-butene, ethylene/propylene/1-pentene, ethylene/propylene/1-hexene, ethylene/propylene/1-octene, ethylene/propylene/1-decene, ethylene/propylene/1-Octadecene, ethylene/propylene/4-methyl-1-pentene, ethylene/1-butene/1-pentene, ethylene/1-butene/1-hexene, ethylene/1-butene/1-octene, ethylene/1-butene/1-decene, ethylene/1-butene/1-octadecene, ethylene/1-butene/4-methyl-1-pentene, ethylene/1-hexene/1-octene, ethylene/1-hexene/1-decene, ethylene/1-hexene/1-octadecene, ethylene/1-hexene/4-methyl-1-pentene, ethylene/1-octene/1-decene, ethylene/1-octene/1-octadecene, ethylene/1-octene/4-methyl-1-pentene, ethylene/1-decene/1-octadecene, ethylene/1-decene/4-methyl-1-pentene, ethylene/1-octadecene/4-methyl-1-pentene, propylene/1-butene/1-hexene, propylene/1-butene/1-octene, propylene/1-butene/1-decene, propylene/1-butene/1-octadecene, propylene/1-butene/4-methyl-1-pentene, propylene/1-hexene/1-octene, propylene/1-hexene/1-decene, propylene/1-hexene/1-octadecene, propylene/1-hexene/4-methyl-1-pentene, propylene/1-octene/1-decene, propylene/1-octene/1-octadecene, propylene/1-octene/4-methyl-1-pentene, propylene/1-decene/1-octadecene, propylene/1-decene/4-methyl-1-pentene, propylene/1-octadecene/4-methyl-1-pentene, 1-butene/1-hexene/1-octene, 1-butene/1-hexene/1-decene, 1-butene/1-hexene/1-octadecene, 1-butene/1-hexene/4-methyl-1-pentene, 1-butene/1-octene/1-decene, 1-butene/1-octene/1-octadecene, 1-butene/1-octene/4-methyl-1-pentene, 1-butene/1-decene/1-octadecene, 1-butene/1-decene/4-methyl-1-pentene, 1-butene/1-octadecene/4-methyl-1-pentene, ethylene/propylene/1-butene/1-hexene, ethylene/propylene/1-butene/1-octene, ethylene/propylene/1-butene/1-decene, ethylene/propylene/1-butene/1-octadecene, ethylene/propylene/1-butene/4-methyl-1-pentene, ethylene/1-butene/1-hexene/1-octene, ethylene/1-butene/1hexene/1-decene, ethylene/1-butene/1-hexene/1-octadecene, ethylene/1-butene/1-hexene/4-methyl-1-pentene, ethylene/propylene/1-hexene/1-octene, ethylene/propylene/1-hexene/1-decene, ethylene/propylene/1-hexene/1-octadecene, ethylene/propylene/1-hexene/4-methyl-1-pentene and the like.

It is preferred that the copolymer (ii) is an olefin-based copolymer obtained by copolymerizing a cyclic olefin and two or more olefins selected from ethylene, propylene and α-olefins having 4 to 20 carbon atoms in the presence of a catalyst for olefin polymerization, wherein the total number of carbon atoms in the selected olefins is 7 or more. As used herein, the above-described "two or more olefins" and "cyclic olefin" are mutually different concepts. When a cyclic olefin is copolymerized, a polyolefin-based resin composition in which the modifier is compounded has improved heat resistance and is capable of being easily cross-linked.

Cyclic monoolefins and cyclic polyenes can be listed as preferred cyclic olefins.

A cyclic olefin is a cyclic compound in which 4 or more carbon atoms form one or more cycles and which may have various substituents containing at least one carbon-carbon double bond in the molecule. Compounds represented by the following general formulae [IV] or [V] can be exemplified as specific structures of such cyclic olefins.

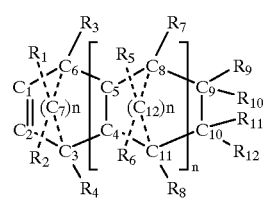

[IV]

[V]

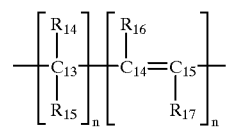

[VI]

wherein, n represents an integer of 0 or more, $C_1$ to $C_{15}$ represent carbon atoms, and $C_1$ and $C_2$ form a polymerizable double bond. $R_1$ to $R_{17}$ represent substituents selected from the group consisting of a hydrogen atom, a halogen atom, a hydroxyl group, an amino group and an organic group having 1 to 20 carbon atoms.

In the general formula [IV], $C_3$ and $C_6$, and $C_8$ and $C_{11}$ can be bonded respectively via $(C_7)_n$ and $(C_{12})_n$. $R_9$, $R_{11}$ and $R_{11}$, $R_{12}$ may form a cycle via the structural formula [VI]. In the general formula [V], a cyclic structure can be formed when $R_{13}$ is represented by Structure shown in the above-formula [VI].

Specific examples of an organic group have 1 to 20 carbon atoms as one member of substituted groups include alkyl groups such as a methyl group, an ethyl group, a propyl group, a butyl group, a hexyl group, an octyl group, a dodecyl group and the like; aryl groups such as a phenyl group, a tolyl group, a naphthyl group and the like; aralkyl groups such as a benzyl group, a phenethyl group and the like; alkylidene groups such as a methylidene group, an ethylidene group and the lie; alkenyl groups such as a vinyl group, allyl group and the like; alkoxy groups such as a methoxy group, an ethoxy group and the like; aryloxy groups such as a phenoxy group and the like; acyl groups such as an acetyl group and the like; alkoxycarbonyl groups such as a methoxycarbonyl group, an ethoxycarbonyl group and the like; acyloxy groups such as an acetyloxy group and the like; substituted silyl groups such as a trimethylsilyl group and the like; and a group of which part of hydrogen atoms of above mentioned alkyl group, aryl group and aralkyl group are substituted by a halogen atom, a hydroxyl group, an amino group, an acyl group, a carboxyl group, an alkoxy group, an alkoxycarbonyl group, an acyloxyl group, a (substituted) silyl group, an alkylamino group or a cyano group.

Specific examples of the cyclic olefin compound represented by the general formula [IV] include norbornene, 5-methylnorbornene, 5-methylnorbornene, 5-propylnorbornene, 5,6-dimethylnorbornene, 1-methylnorbornene, 7-methylnorbornene, 5,5,6-trimethylnorbornene, 5-phenylnorbornene, 5-benzylnorbornene, 5-ethylidenenorbornene, 5-vinylnorbornene, 1,4,5,8-dimethano-1,2,3,4,4a,5,8,8a-octabydronaphthalene, 2-methyl-1,4,5,8-dimethano-1,2,3,4, 4a,5,8,8a-octahydronaphthalene, 2-ethyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-hexyl-1,4,5,8-dimethano-1,2,3,4, 4a,5,8,8a-octahydronaphthalene, 2-ethylidene-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, 1,5dimethyl-1,4,5,8-dethano-1,2,3,4, 4a,5,8,8a-octahydronaphthalene, 2-cyclohexyl-1,4,5,8-dimethano1,2,3,4,4a,5,8,8a-octahydronaphthalene, 2,3-dichloro11,4,5,8-dimethano-1,2,3,4,4a,5,8,8a-octahydronaphthalene, 2-isobutyl-1,4,5,8-dimethano-1,2,3, 4,4a,5,8,8a-octahydronaphthalene, 1,2-dihydrodicyclopentadiene, 5-chloronorbornene, 5,5-dichloronorbornene, 5-fluoronorbornene, 5,5,6-trifluoro-6-trifluoromethylnorbornene, 5-chloromethyhnorbornene, 5-methoxynorbornene, 5,6-dicarboxynorbornene anhydrate, 5-dimethylaminonorbornene, 5-cycnonorbornene and the like.

Examples of the cyclic olefin compound represented by the general formula [V] include cyclopentene, 3-methylcyclopentene, 4-methylcyclopentene, 3,4-dimethylcyclopentene, 3,5ethylcyclopentene, 3-chlorocyclopentene, cyclohexene, 3-methylcyclohexene, 4-methylcyclohexene, 3,4-dimethylcyclohexene, 3-chlorocyclohexene, cycloheptene and the like.

Specific examples of the compound represented by the general formula [IV] having two or more carbon-carbon double bonds in a cyclic olefin molecule include 5-ethylidene-2-norbornene, 5-methylene-2-norbornene, 5-isopropylidene-2-norbornene, 3-vinylcyclohexene, 4-vinylcyclohexene, 5-vinylnorbornene, 5-allylnorbornene, 5,6-diethylidene-2-norbornene, dicyclopentadiene, dimethylcyclopentadiene, 2,5-norbornadiene and the like.

Examples of the cyclic polyene compound represented by the general formula [V] include 1,3-cyclopentadiene, 1,3-cyclohexadiene, 1,4-cyclohexadiene, 5-ethyl-1,3-cyclohexadiene, 1,3-cycloheptadiene, 1,3-cyclooctadiene and the like.

The content of the cyclic olefin in the copolymer (ii) is preferably from 0.01 to 20 mol %, more preferably from 0.05 to 15 mol %, still more preferably from 0.1 to 10 mol %, and particularly preferably from 0.15 to 5 mol %. When the content of the cyclic olefin is too low, a molded article obtained by using the resulting polyolefin-based resin composition may have poor heat resistance. On the other hand, when the content of the cyclic olefin is too high, a molded article obtained by using the resulting polyolefin-based resin composition may exhibit a poor balance between strength and flexibility.

The olefin monomer polymerized in the copolymer (ii) can include propylene, or ethylene and propylene.

The content of ethylene monomer units as the olefin in the copolymer (ii) is preferably 80 mol % or less, more preferably 70 mol % or less, still more preferably 60 mol % or less, and particularly preferably 50 mol % or less, from the standpoint of the effect on improving the flexibility of the polyolefin-based resin composition. When the content is outside this range, the olefin-based copolymer may contain a crystal derived from ethylene, and a molded article obtained by using the resulting polyolefin-based resin composition may have poor flexibility.

On the other hand, particularly when low temperature resistance is required, the content of propylene monomer units in the copolymer (ii) is preferably 90% or less, more preferably 80% or less, still more preferably 70% or less, particularly preferably 60% or less, and most preferably 50% or less. When the content is outside this range, a molded article obtained by using the resulting polyolefin-based resin composition may exhibit a poor low temperature impact property.

It is preferable that the copolymer (ii) satisfy the following formulas in which x represents mol content of ethylene in the copolymer, and y represents the total mol content of α-olefins having 4 to 20 carbon atoms in the copolymer:

$$[y/x+y] \geq 0.2,$$

more preferably $$[y/x+y] \geq 0.3$$

still more preferably $$[y/x+y] \geq 0.4, \text{ and}$$

particularly preferably $$[y/x+y] \geq 0.5.$$

When the above-described range is not satisfied, a molded article obtained by using the resulting polyolefin-based resin composition may have poor flexibility.

The copolymer (ii) has an intrinsic viscosity [η] measured using a tetralin solvent at 135° C. of preferably 0.3 to 10, more preferably 0.5 to 7, and further preferably 0.7 to 5. When the intrinsic viscosity is too low, a molded article obtained by using the resulting polyolefin-based resin composition may have poor strength. On the other hand, when the intrinsic viscosity is too high, a molded article obtained by using the resulting polyolefin-based resin composition may have poor flexibility. The intrinsic viscosity [η] is measured using a Ubbelohde viscometer in tetralin at 135° C. A 300 mg sample is dissolved in 100 ml of tetralin to prepare a solution of 3 mg/ml. This solution is further diluted to ½, ⅓ and ⅕, and the resulting solutions are respectively measured (in a constant temperature oil bath at 135° C. (±0.1° C.)). The measurement is repeated three times at respective concentrations, and the values obtained are averaged.

It is preferable that the copolymer (ii) has neither a peak of 1 J/g or more based on crystal melting, nor a peak of 1 J/g or more based on crystallization in a measurement using differential scanning calorimetry (DSC). When the copolymer (ii) has such peak, a molded article obtained by using the resulting polyolefin-based resin composition may have poor flexibility. As the differential scanning calorimeter, for example model DSC220C manufactured by Seiko Denshi Kogyo K.K., is used and the measurent is conducted at a rate of 10° C./min in any of the temperurue increasing process and temperature decreasing process.

The copolymer (ii) can be produced in a polymerization catalyzed using a known Ziegler Natta type catalyst or a metallocene catalyst. A metallocene catalyst is preferably used since a copolymer having high molecular weight, narrow molecular weight distribution and narrow composition distribution is obtained. As the metallocene catalyst, transition metal complexes of Groups 4A to 6A of the periodic table having at least one cyclopentadienyl skeleton can be used. Specific examples of the metallocene catalyst are the metallocene catalysts described in, for example, Japanese Patent Application Laid-Open (JP-A) Nos. 9-12635 and 9-151205.

Particularly, the orientation of propylene and/or α-olefin side chains having 4 to 20 carbon atoms in the copolymer (ii) has an atactic structure. When the copolymer is used as a modifier, the resulting polyolefin-based resin composition may have poor flexibility and transparency when its not atactic. To provide atactic stereoregularity in this copolymer, production can be optimally conducted by copolymerizing two or more olefins selected from ethylene, propylene and α-olefins having 4 to 20 carbon atoms wherein the total number of carbon atoms in the selected olefins is 7 or more, and optionally any cyclic olefin, in the presence of a catalyst for olefin polymerization consisting of the following compound (A), (B) and/or (C).

(A) represents at least one transition metal complex represented by the following formula [I], [II] or [III]:

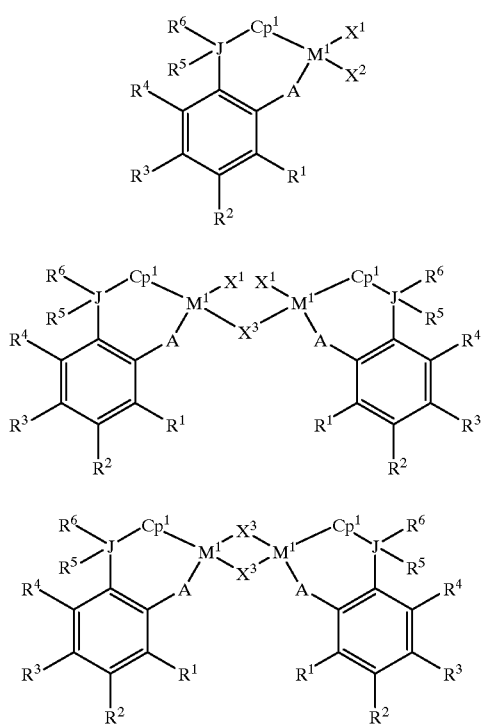

wherein $M^1$ represents a transition metal atom of group IV in the Periodic Table of the Elements; A represents an atom of group XVI in the Periodic Table of the Elements; J represents an atom of group XIV in the Periodic Table of the Elements; $Cp^1$ represents a group having a cyclopentadiene-type anion skeleton; $X^1$, $X^2$, $R^1$, $R^2$, $R^3$, $R^4$, $R^5$ and $R^6$ independently represent a hydrogen atom, a halogen atom, an alkyl group, an aralkyl group, an aryl group, a substituted silyl group, an alkoxy group, an aralkyloxy group, an aryloxy group, or a disubstituted amino group; and $R^1$, $R^2$, $R^3$, $R^4$, $R^1$ and $R^6$ may be combined optionally to form a ring; $X^3$ represents an atom of group XVI in the Periodic Table of Elements; and two of $M^1$, A, J, $Cp_1$, $X^1$, $X^2$, $X^3$, $R^1$, $R^2$, $R^3$, $R^4$, $R^5$ and $R^6$ may be the same or different.

(B) represents one or more of the aluminum compounds selected from the following (B1)–(B3):
(B1) an organoaluminum compound represented by the general formula

(B2) a cyclic aluminoxane represented by the general formula

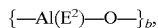

and (B3) a linear aluminoxane represented by the general formula

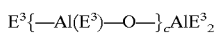

wherein $E^1$, $E^2$ and $E^3$, respectively represent a hydrocarbon group and each of the $E^1$, $E^2$ and $E^3$ groups may be the same or different; Z represents a hydrogen atom or a halogen atom and each of the Z groups may be the same or different; the a value satisfies the equation $0<a \leq 3$; b represents an integer of 2 or more; and c represents an integer of 1 or more.

(C) represents any one boron compound of the following (C1)–(C3):
(C1) a boron compound represented by the general formula $BQ^1Q^2Q^3$,
(C2) a boron compound represented by the general formula $G^+(BQ^1Q^2Q^3, Q^4)^-$, and
(C3) a boron compound represented by the general formula $(L-H)^+(BQ^1Q^2Q^3Q^4)^-$
wherein B represents a trivalent boron atom in the valence state, $Q^1$ to $Q^4$ may each be the same or different and represent a halogen atom, a hydrocarbon group, a halogenated hydrocarbon group, a substituted silyl group, an alkoxy group or a disubstituted amino group; $G^+$ is an inorganic or organic cation; L is a neutral Lewis base; and $(L-H)^+$ is a Bronsted acid.

(A) The transition metal complex

In the general formulas [I], [II] and [III], the transition metal atom represented by $M^1$ is a transition metal element of group IV in the Periodic Table of the Elements (Revised version 1989 of IUPAC, Inorganic Chemistry Nomenclature) and examples thereof include a titanium atom, a zirconium atom, a hafnium atom, or the like. The transition metal atom is preferably a titanium atom or a zirconium atom Examples of the atom of the group XVI in the Periodic Table of the element represented by "A" in the general formulas [I], [II] or [III] include an oxygen atom, a sulfur atom, a selenium atom, etc. It is preferably an oxygen atom.

Examples of the atom of group XIV in the Periodic Table of the element represented by "J" in the general formulas [I], [II] or [III] include a carbon atom, a silicon atom, a germanium atom and the like. It is preferably a carbon atom or a silicon atom.

Examples of the group having a cyclopentadiene type anion skeleton represented by the substituent $Cp^1$ include a $\eta^5$-(substituted)cyclopentadienyl group, $\eta^5$-(substituted) indenyl and a group, $\eta^5$-(substituted)fluorenyl group, etc. Examples thereof are $\eta^5$-cyclopentadienyl group, $\eta^5$-methylcyclopentadiene group, $\eta^5$-dimethylcyclopentadienyl group, $\eta^5$-trimethylcyclopentadienyl group, $\eta^5$-tetramethylcyclopentadienyl group, $\eta^5$-ethylcyclopentadienyl group, $\eta^5$-n-propylcyclopentadienyl group, $\eta^5$-isopropylcyclopentadienyl group, $\eta^5$-n-butylcyclopentadienyl group, $\eta^5$-sec-butylcyclopentadienyl group, $\eta^5$-tert-butylcyclopentadienyl group, $\eta^5$-n-pentylcyclopentadienyl group, $\eta^5$-neopentylcyclopentadienyl group, $\eta^5$-n-hexylcyclopentadienyl group, $\eta^5$-n-octylcyclopentadienyl group, $\eta^5$-n-phenylcyclopentadienyl group, $\eta^5$-naphthylcyclopentadienyl group, $\eta^5$-trimethylsilylcyclopentadienyl group, $\eta^5$-triethylsilylcyclopentadienyl group, $\eta^5$-tert-butyldimethylsilylcyclopentadienyl group, $\eta^5$-indenyl group, $\eta^5$-methyl indenyl group, $\eta^5$-dimethylindenyl group, $\eta^5$-ethylindenyl group, $\eta^5$-n-propylindenyl group, $\eta^5$-isopropylindenyl group, $\eta^5$-n-butylindenyl group, $\eta^5$-sec-butylindenyl group, $\eta^5$-tert-butylindenyl group, $\eta^5$-n-pentylindenyl group, $\eta^5$-neopentylindenyl group, $\eta^5$-n-hexylindenyl group, $\eta^5$-n-octylindenyl group, $\eta^5$-n-decylindenyl group, 5-phenylindenyl group, $\eta^5$-methylphenylindenyl group, 5-naphthylindenyl group, $\eta^5$-trimethylsilylindenyl group, $\eta^5$-triethylsilylindenyl group, $\eta^5$-tert-butyldimethylsilylindenyl group, $\eta^5$-tetrahydroindenyl group, $\eta^5$-fluorenyl group, $\eta^5$-methylfluorenyl group, $\eta^5$-dimethylfluorenyl group, $\eta^5$-ethylfluorenyl group, $\eta^5$-diethylfluorenyl group, $\eta^5$-n-propylfluorenyl group, $\eta^5$-di-n-propylfluorenyl group, $\eta^5$-isopropylfluorenyl group, $\eta^5$-diisopropylfluorenyl group, $\eta^5$-n-butylfluorenyl group, $\eta^5$-sec-butylfluorenyl group, $\eta^5$-tert-butylfluorenyl group, $\eta^5$-di-n-butylfluorenyl group, $\eta^5$-di-sec-butylfluorenyl group, $\eta^5$-di-tert-butylfluorenyl group, $\eta^5$-n-pentylfluorenyl group, $\eta^5$-neopentylfluorenyl group, $\eta^5$-n-hexylfluorenyl group, $\eta^5$-n-octylfluorenyl group, $\eta^5$-n-decylfluorenyl group, $\eta^5$-n-dodecylfluorenyl group, $\eta^5$-phenylfluorenyl group, $\eta^5$-di-phenylfluorenyl group, $\eta^5$-methylphenylfluorenyl group, $\eta^5$-naphthylfluorenyl group, $\eta^5$-trimethylsilylfluorenyl group, $\eta^5$-bis-trimethylsilylfluorenyl group, $\eta^5$-triethylsilylfluorenyl group, $\eta^5$-tert-butyldimethylsilylfluorenyl group, etc. It is preferably a $\eta^5$-cyclopentadienyl group, $\eta^5$-methylcyclopentadienyl group, $\eta^5$-tert-butylcyclopentadienyl group, $\eta^5$-tetramethylcyclopentadienyl group, $\eta^5$-indenyl group or $\eta^5$-fluorenyl group.

Examples of the halogen atom in the substituents $X^1$, $X^2$, $R^1$, $R^2$, $R^3$, $R^4$, $R^5$ and $R^6$ include a fluorine atom, chlorine atom, bromine atom, and iodine atom and the like. It is preferably a chlorine atom or a bromine atom, and more preferably it is a chlorine atom.

An alkyl group in the substituents $X^1$, $X^2$, $R^1$, $R^2$, $R^3$, $R^4$, $R^5$ and $R^6$ is preferably an alkyl group having 1–20 carbon atoms. Examples of such alkyl groups include a methyl group, ethyl group, n-propyl group, isopropyl group, n-butyl group, sec-butyl group, tert-butyl group, n-pentyl group, neopentyl group, amyl group, n-hexyl group, n-octyl group, n-decyl group, n-dodecyl group, n-pentadecyl group, n-eicosyl group, etc. By preference it is a methyl group, ethyl group, isopropyl group, tert-butyl group or amyl group.

These alkyl groups may be substituted with a halogen atom such as a fluorine atom, chlorine atom, bromine atom, iodine atom or the like. Examples of alkyl groups having 1–20 carbon atoms substituted with halogen atom(s) include a fluoromethyl group, difluoromethyl group, trifluoromethyl group, chloromethyl fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group; tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, perbromoeicosyl group or the like.

These alkyl groups may be partially substituted by an alkoxy group such as a methoxy group, an ethoxy group, an aryloxy group (such as a phenoxy group), or aralkyloxy group (such as a benzyloxy group), etc.

An arakyl group in the substituents $X^1$, $X^2$, $R^1$, $R^2$, $R^3$, $R^4$, $R^5$ and $R^6$ is preferably an aralkyl group having 7–20 carbon atoms. Such aralkyl groups include, for example, a benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (4,6-dimethylphenyl)methyl group, (2,3,4-trimethylphenyl)methyl group, (2,3,5-trimethylphenyl)methyl group, (2,3,6-trimetbyiphenyl)methyl group, (3,4,5-trimethylphenyl)methyl group, (2,4,6-trimethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tertbutylphenyl)methyl group, (n-pentylphenyl)methyl group, (neopentylphenyl)methyl group, (n-hexylphenyl)methyl group, (n-octylphenyl)methyl group, (n-decylphenyl)methyl group, (n-dodecylphenyl)methyl group, (n-tetradecylphenyl)methyl group, naphthylmethyl group, anthracenylmethyl group, etc. It is preferably a benzyl group.

These aralkyl groups may be partially substituted with a halogen atom such as a fluorine atom, chlorine atom, bromine atom, or iodine atom; an alkoxy group such as a methoxy, ethoxy, aryloxy group (such as phenoxy), or an aralkyloxy group (such as benzloxy), or the lie.

An aryl group in the substituents $X^1$, $X^2$, $R^1$, $R^2$, $R^3$, $R^4$, $R^5$ and $R^6$ is preferably an aryl group having 6–20 carbon atoms. Such aryl groups include, for example, a phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6- tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, and anthracenyl group, etc. It is preferably a phenyl group.

These aryl groups may be partially substituted with a halogen atom such as fluorine atom, chlorine atom, bromine atom, or iodine atom; an alkoxy group such as a methoxy or ethoxy; an aryloxy group (such as phenoxy); or aralkyloxy group (such as benzyloxy), and the like.

The substituted silyl group in the substituents $X^1$, $X^2$, $R^1$, $R^2$, $R^3$, $R^4$, $R^5$ and $R^6$ is a silyl group substituted with a hydrocarbon group. Examples of the hydrocarbon group include an alkyl group having 1–10 carbon atoms such as a methyl group, ethyl group, n-propyl group, isopropyl group, n-butyl group, sec-butyl group, tert-butyl group, isobutyl group, n-pentyl group, n-hexyl group, cyclohexyl group, etc.; and an aryl group (such as a phenyl group), etc. Examples of the substituted silyl group having 1–20 carbon atoms include a monosubstituted silyl group having 1–20 carbon atoms such as a methylsilyl group, an ethylsilyl group, a phenylsilyl group, etc.; a disubstituted silyl group having 2–20 carbon atoms such as a dimethylsilyl group, a dimethylsilyl group, a diphenylsilyl group, etc.; and a trisubstituted silyl group having 3–20 carbon atoms such as a trimethylsilyl group, a triethylsilyl group, a tri-n-propylsilyl group, a triisopropylsilyl group, a tri-n-butylsilyl group, a tri-sec-butylsilyl group, a tri-tert-butylsilyl group, a tri-isobutylsilyl group, a tert-butyl-dimethylsilyl group, a tri-n-pentylsilyl group, a tri-n-hexylsilyl group, a tricyclohexylsilyl group, or a triphenylsilyl group, etc. It is preferably a trimethylsilyl group, a tert-butyldimethylsilyl group or a triphenylsilyl group.

The hydrocarbon group in a hydrocarbon-group-substituted silyl group may be substituted with a halogen atom such as a fluorine atom, chlorine atom, bromine atom, or iodine atom and the lie; and/or an alkoxy group such as a methoxy, an ethoxy, an aryloxy group (such as a phenoxy), or an arakyloxy group (such as a benzyloxy group), and the like.

The alkoxy group in the substituents $X^1$, $X^2$, $R^1$, $R^2$, $R^3$, $R^4$, $R^5$ and $R^6$ is preferably an alkoxy group having 1–20 carbon atoms. Such alkoxy groups include, for example, a metboxy group, an ethoxy group, a n-propoxy group, an isopropoxy group, a n-butoxy group, a sec-butoxy group, a t-butoxy group, a n-pentoxy group, a neopentoxy group, a n-hexoxy group, an n-octoxy group, an n-dodecoxy group, a n-pentadecoxy group, or an n-eicosoxy group, etc. It is preferably a methoxy group, an ethoxy group or a t-butoxy group.

These alkoxy groups may be partially substituted with a halogen atom such as a fluorine atom, chlorine atom, bromine atom, or iodine atom and the like; an alkoxy group such as a methoxy or an ethoxy, an aryloxy group (such as a phenoxy group); or an arakyloxy group (such as a benzyloxy group); and the like.

An aralkyloxy group in the substituents $X^1$, $X^2$, $R^1$, $R^2$, $R^3$, $R^4$, $R^5$ and $R^6$, is preferably an aralkyloxy group having 7–20 carbon atoms. Examples of the aralkyloxy group include a benzyloxy group, (2-methylphenyl) methoxy group, (3-methylphenyl) methoxy group, (4-methylphenyl) methoxy group, (2,3-dimethylphenyl) methoxy group, (2,4-dimethylphenyl) methoxy group, (2,5-dimethylphenyl) methoxy group, (2,6-dimethylphenyl) methoxy group, (3,4-dimethylphenyl) methoxy group, (3,5-dimethylphenyl) methoxy group, (2,3,4-trimethylphenyl) methoxy group, (2,3,5-trimethylphenyl) methoxy group, (2,3,6-trimethylphenyl) methoxy group, (2,4,5-trimethylphenyl) methoxy group, (2,4,6-trimethylphenyl) methoxy group, (3,4,5trimethylphenyl) methoxy group, (2,3,4,5-tetramethylphenyl) methoxy group, (2,3,4,6-tetramethylphenyl) methoxy group, (2,3,5,6-tetramethylphenyl) methoxy group, (pentamethylphenyl) methoxy group, (ethylphenyl) methoxy group, (n-propylphenyl) methoxy group, (isopropylphenyl) methoxy group, (n-butylphenyl) methoxy group, (sec-butylphenyl) methoxy group, (tert-butylphenyl) methoxy group, (n-hexylphenyl) methoxy group, (n-octylphenyl) methoxy group, (n-decylphenyl) methoxy group, (n-tetradecylphenyl) methoxy group, naphthylmethoxy group, or anthracenylmethoxy group, etc. It is preferably a benzyloxy group.

These aralkyloxy groups may be partially substituted with a halogen atom such as fluorine atom, chlorine atom, bromine atom, or iodine atom and the like; an alkoxy group such as methoxy or ethoxy; an aryloxy group (such as phenoxy); or aralkyloxy group (such as benzyloxy), and the like.

Examples of the aryloxy group in the substituents $X^1$, $X^2$, $R^1$, $R^2$, $R^3$, $R^4$, $R^5$ and $R^6$ include an aryloxy group having 6–20 carbon atoms such as a phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2,3,4-trimethylphenoxy group, 2,3,5-trimethylphenoxy group, 2,3,6-trimethylphenoxy group, 2,4,5-trimethylphenoxy group, 2,4,6-trimethylphenoxy group, 3,4,5-trimethylphenoxy group, 2,3,4,5-tetramethylphenoxy group, 2,3,4,6-tetramethylphenoxy group, 2,3,5,6-tetramethylphenoxy group, pentamethylphenyloxy group, ethylphenoxy group, n-propylphenoxy group, isopropyiphenoxy group, n-butylphenoxy group, sec-butylphenoxy group, tert-butylphenoxy group, n-hexylphenoxy group, n-octylphenoxy group, n-decylphenoxy group, n-tetradecylphenoxy group, naphthoxy group, anthracenoxy group and the like.

These aryloxy groups may be partially substituted with a halogen atom such as a fluorine atom, chlorine atom, bromine atom, or iodine atom and the like; an alkoxy group such as methoxy or ethoxy; an aryloxy group (such as phenoxy); or aralkyloxy group (such as benzyloxy), and the like.

The disubstituted amino group in the substituents $X^1$, $X^2$, $R^1$, $R^2$, $R^3$, $R^4$, $R^5$ and $R^6$ is an amino group substituted with two hydrocarbon groups. Examples of a hydrocarbon group include an alkyl group having 1–10 carbon atoms such as a methyl group, ethyl group, n-propyl group, isopropyl group, n-butyl group, sec-butyl group, tert-butyl group, isobutyl group, n-pentyl group, n-hexyl group, cyclohexyl group, etc.; an aryl group having 6–10 carbon atoms such as a phenyl group; and an aralkyl group having 7–10 carbon atoms etc. Examples of the amino group disubstituted with hydrocarbon groups having 1–10 carbon atoms include a dimethylamino group, diethylamino group, di-n-propylamino group, diisopropylamino group, di-n-butylamino group, di-sec-butylamino group, di-tert-butyl amino group, di-isobutylamino group, tert-butylisopropylamino group, di-n-hexylamino group, di-n-octylamino group, di-n-decylamino group, diphenylamino group, bistrimethylsilylamino group, or bis-tert-butyldimethylsilylamino group, etc. It is preferably a dimethylamino group or diethylamino group.

These disubstituted amino groups may be substituted partly with a halogen atom such as a fluorine atom, chlorine atom, bromine atom, or iodine atom and the like; an alkoxy group such as methoxy group, ethoxy group and the like; an aryloxy group (such as a phenoxy group and the like; or an aralkyloxy group (such as benzyloxy group) and the like.; or an aralkyloxy group such as benzyloxy group and the like.

The substituents $R^1$, $R^2$, $R^3$, $R^4$, $R^5$ and $R^6$ may be optionally combined to form a ring.

$R^1$ is preferably an alkyl group, an aralkyl group, an aryl group, or a substituted silyl group.

$X^1$ and $X^2$ independently and preferably represent a halogen atom, an alkyl group, an aralkyl group, an alkoxy group, an aryloxy group, or a disubstituted amino group, and more preferably represent a halogen atom or an alkoxy group.

Examples of the atom of group XVI in the Periodic Table include an oxygen atom, sulfur atom, and selenium atom. The atom is preferably an oxygen atom.

Examples of the transition metal complex represented by the general formula [I] include:

methylene (cyclopentadienyl)(3,5-dimethyl-2-phenoxy)titanium dichloride, methylene (cyclopentadienyl)(3-tert-butyl-2-phenoxy)titanium dichloride, methylene (cyclopentadienyl)(3-tert-butyl-5-methyl-2-phenoxy)titanium dichloride, methylene (cyclopentadienyl) (3-phenyl-2-phenoxy)titanium dichloride, methylene (cyclopentadienyl) (3-tert-butyldimethylsilyl-5-methyl-2-phenoxy)titanium dichloride, methylene (cyclopentadienyl)(3-trimethylsilyl-5-methyl-2-phenoxy)titanium dichloride, methylene (cyclopentadienyl (3-tert-butyl-5-methoxy-2-phenoxy)titanium dichloride, methylene (cyclopentadienyl (3-tert-butyl-5-chloro-2-phenoxy)titanium dichloride, methylene (methylcyclopentadienyl) (3,5-dimethyl-2-phenoxy)titanium dichloride, methylene (methylcyclopentadienyl)(3-tert-butyl-2-phenoxy)titanium dichloride, methylene (methylcyclopentadienyl)(3-tert-butyl-5-methyl-2-phenoxy)titanium dichloride, methylene (methylcyclopentadienyl)(3-phenyl-2-phenoxy)titanium dichloride, methylene (methylcyclopentadienyl) (3-tert-butyldimethylsilyl-5-methyl-2-phenoxy)titanium dichloride, methylene (methylcyclopentadienyl) (3-trimethylsilyl-5-methyl-2-phenoxy)titanium dichloride, methylene (methylcyclopentadienyl)(3-tert-butyl-5-methoxy-2-phenoxy)titanium dichloride, methylene (methylcyclopentadienyl)(3-tert-butyl-5-chloro-2-phenoxy)titanium dichloride, methylene (text-butylcyclopentadienyl) (3,5-dimethyl-2-phenoxy)titanium chloride, methylene (tert-butylcyclopentadienyl)(3-tert-butyl-2-phenoxy)titanium dichloride, methylene (tert-butylcyclopentadienyl)(3-tert-butyl-5-methyl-2phenoxy)titanium dichloride, methylene (tert-butylcyclopentadienyl)(3-phenyl-2-phenoxy)titanium dichloride, methylene (tert-butylcyclopentadienyl) (3-tertbutyldimethylsilyl-5-methyl-2-phenoxy)titanium dichloride, methylene (tert-butylcyclopentadienyl) (3-trimethylsilyl-5-methyl-2-phenoxy)titanium dichloride, methylene (tert-butylcyclopentadienyl) (3-tert-butyl-5-methoxy-2-phenoxy)titanium dichloride, methylene (tert-butylcyclopentadienyl)(3-tert-butyl-5-chloro-2-phenoxy)titanium dichloride, methylene (tetramethylcyclopentadienyl)(3,5-dimethyl-2-phenoxy)titanium dichloride, methylene (tetramethylcyclopentadienyl)(3-tert-butyl-2-phenoxy)titanium dichloride, methylene (tetramethylcyclopentadienyl) (3-tert-butyl-5-methyl-2-phenoxy)titanium dichloride, methylene (tetramethylcyclopentadienyl)(3-phenyl-2-phenoxy)titanium dichloride, methylene (tetramethylcyclopentadienyl) (3-tert-butyldimethylsilyl-5-methyl-2-phenoxy)titanium dichloride, methylene (tetramethylcyclopentadienyl) (3-trimethylsilyl-5-methyl-2-phenoxy)titanium dichloride, methylene (tetramethylcyclopentadienyl) (3-tert-butyl-5-methoxy-2-phenoxy)titanium dichloride, methylene (tetramethylcyclopentadienyl) (3-tert-butyl-5-chloro-2-phenoxy)titanium dichloride, methylene (trimethylsilylcyclopentadienyl)(3,5-dimethyl-2-phenoxy)titanium dichloride, methylene (trimethylsilylcyclopentadienyl) (3-tert-butyl-2-phenoxy)titanium dichloride, methylene (trimethylsilylcyclopentadienyl) (3-tert-butyl-5-methyl-2-phenoxy)titanium dichloride, methylene (trimethylsilylcyclopentadienyl)(3-phenyl-2-phenoxy)titanium dichloride, methylene (trimethylsilylcyclopentadienyl) (3-tertbutyldimethylsilyl-5-methyl-2-phenoxy) titanium dichloride, methylene (trimethylsilylcyclopentadienyl) (3-trimethylsilyl-5-methyl-2-phenoxy)titanium dichloride, methylene (trimethylsilylcyclopentadienyl) (3-tert-butyl-5-methoxy-2-phenoxy)titanium dichloride, methylene (trimethylsilylcyclopentadienyl) (3-tert-butyl-5-chloro-2-phenoxy)titanium dichloride, methylene (fluorenyl)(3,5-dimethyl-2-phenoxy)titanium dichloride, methylene (fluorenyl)(3-tert-butyl-2-phenoxy)titanium dichloride, methylene (fluorenyl)(3-tert-butyl-5-methyl-2-phenoxy)titanium dichloride, methylene (fluorenyl)(3-phenyl-2-phenoxy)titanium dichloride, methylene (fluorenyl)(3-tert-butyldimethylsilyl-5-methyl-2-phenoxy)titanium dichloride, methylene (fluorenyl)(3-trimethylsilyl-5-methyl-2-phenoxy)titanium dichloride, methylene (fluorenyl)(3-tert-butyl-5-methoxy-2-phenoxy)titanium dichloride, methylene (fluorenyl)(3-tert-butyl-5-chloro-2-phenoxy)titanium dichloride, isopropylidene (cyclopentadienyl)(3,5-dimethyl-2-phenoxy)titanium dichloride, isopropylidene (cyclopentadienyl)(3-tert-butyl-2-phenoxy)titanium dichloride, isopropylidene (cyclopentadienyl)(3-tert-butyl-5-methyl-2-phenoxy)titanium dichloride, isopropylidene (cyclopentadienyl)(3-phenyl-2-phenoxy)titanium dichloride, isopropylidene (cyclopentadienyl)(3-tert-butyldimethylsilyl-5-methyl-2-phenoxy)titanium dichloride, isopropylidene (cyclopentadienyl)(3-trimethylsilyl-5-methyl-2-phenoxy)titanium dichloride, isopropylidene (cyclopentadienyl (3-tert-butyl-5-methoxy-2-phenoxy) titanium dichloride, isopropylidene (cyclopentadienyl) (3-tert-butyl-5-chloro-2-phenoxy)titanium dichloride, isopropylidene (methylcyclopentadienyl)(3,5-dimethyl-2-phenoxy)titanium dichloride, isopropylidene (methylcyclopentadienyl)(3-tert-butyl-2-phenoxy)titanium dichloride, isopropylidene (methylcyclopentadienyl) (3-tert-butyl-5-methyl-2-phenoxy)titanium dichloride, isopropylidene (methylcyclopentadienyl)(3-phenyl-2-phenoxy)titanium dichloride, isopropylidene (methylcyclopentadienyl) (3-tert-butyldimethylsilyl-5-methyl-2-phenoxy)titanium dichloride, isopropylidene (methylcyclopentadienyl) (3-trimethylsilyl-5-methyl-2-phenoxy)titanium dichloride, isopropylidene (methylcyclopentadienyl) (3-tert-butyl-5-methoxy-2-phenoxy)titanium dichloride, isopropylidene (methylcyclopentadienyl) (3-tert-butyl-5-chloro-2-phenoxy)titanium dichloride, isopropylidene (tert-butylcyclopentadienyl)(3,5-dimethyl-2-phenoxy)titanium dichloride, isopropylidene (tert-butylcyclopentadienyl) (3-tert-butyl-2-phenoxy)titanium dichloride, isopropylidene (tert-butylcyclopentadienyl)(3-tert-butyl-5-methyl-2-phenoxy)titanium dichloride, isopropylidene(tert-butylcyclopentadienyl)(3-phenyl-2-phenoxy)titanium dichloride, isopropylidene (tert-butylcyclopentadienyl) (3-tert-butyldimethylsilyl-5-methyl-2-phenoxy)titanium dichloride, isopropylidene (tert-butylcyclopentadienyl)(3-trimethylsilyl-5-methyl-2-phenoxy)titanium dichloride, isopropylidene (tert-butylcyclopentadienyl)(3-tert-butyl-5-methoxy-2-phenoxy)titanium dichloride, isopropylidene (tert-butylcyclopentadienyl)(3-tert-butyl-5-chloro-2-phenoxy)titanium dichloride, isopropylidene (tetramethylcyclopentadienyl)(3,5-dimethyl-2-phenoxy)titanium~dichloride, isopropylidene(tetramethylcyclopentadienyl)(3-tert-butyl-2-phenoxy)titanium dichloride, isopropylidene (tetramethylcyclopentadienyl)(3-tert-butyl-5-methyl-2-phenoxy)titanium dichloride, isopropylidene (tetramethylcyclopentadienyl)(3-phenyl-2-phenoxy) titanium dichloride, isopropylidene (tetramethylcyclopentadienyl)(3-tert-butyldimethylsilyl-5-methyl-2-phenoxy)titanium dichloride, isopropylidene (tetramethylcyclopentadienyl)(3-trimethylsilyl-5-methyl-2-phenoxy)titanium dichloride, isopropylidene (tetramethylcyclopentadienyl)(3-tert-butyl-5-methoxy-2-phenoxy)titanium dichloride, isopropylidene (tetramethylcyclopentadienyl)(3-tert-butyl-5-chloro-2-phenoxy)titanium dichloride, isopropylidene (trimethylsilylcyclopentadienyl)(3,5-dimethyl-2-phenoxy)titanium dichloride, isopropylidene (trimethylsilylcyclopentadienyl)(3-tert-butyl-2-phenoxy)titanium dichloride, isopropylidene (trimethylsilylcyclopentadienyl)(3-tert-butyl-5-methyl-2-phenoxy)titanium dichloride, isopropylidene (trimethylsilylcyclopentadienyl)(3-phenyl-2-phenoxy)titanium dichloride, isopropylidene (trimethylsilylcyclopentadienyl) (3-tertbutyldimethylsilyl-5-methyl-2-phenoxy) titanium dichloride, isopropylidene (trimethylsilylcyclopentadienyl) (3-trimethylsilyl-5-methyl-2-phenoxy)titanium dichloride, isopropylidene (trimethylsilylcyclopentadienyl)(3-tert-butyl-5-methoxy-2-phenoxy)titanium dichloride, isopropylidene (trimethylsilylcyclopentadienyl)(3-tert-butyl-5-chloro-2-phenoxy)titanium dichloride, isopropylidene (fluorenyl)(3,5-dimethyl-2-phenoxy) titanium dichloride, isopropylidene (fluorenyl)(3-tert-butyl-2-phenoxy) titanium dichloride, isopropylidene (fluorenyl)(3-tert-butyl-5-methyl-2-phenoxy)titanium dichloride, isopropylidene (fluorenyl)(3-phenyl-2-phenoxy)titanium dichloride, isopropylidene (fluorenyl)(3-tert-butyldimethylsilyl-5-methyl-2-phenoxy)titanium dichloride, isopropylidene (fluorenyl)(3-trimethylsilyl-5-methyl-2-phenoxy)titanium dichloride, isopropylidene (fluorenyl)(3-tert-butyl-5-methoxy-2-phenoxy) titanium dichloride, isopropylidene (fluorenyl)(3-tert-butyl-5-chloro-2-phenoxy)titanium dichloride, diphenylmethylene (cyclopentadienyl)(3,5-dimethyl-2-phenoxy)titanium dichloride, diphenylmethylene (cyclopentadienyl)(3-tert-butyl-2-phenoxy)titanium dichloride, diphenylmethylene (cyclopentadienyl)(3-tert-butyl-5-methyl-2-phenoxy)titanium dichloride, diphenylmethylene (cyclopentadienyl)(3-phenyl-2-phenoxy) titanium dichloride, diphenylmethylene (cyclopentadienyl(3-tert-butyldimethylsilyl-5-methyl-2-phenoxy)titanium dichloride, diphenylmethylene (cyclopentadienyl)(3-trimethylsilyl-5-methyl-2-phenoxy)titanium dichloride, diphenylmethylene (cyclopentadienyl)(3-tert-butyl-5-methoxy-2-phenoxy) titanium dichloride, diphenylmethylene (cyclopentadienyl)(3-tert-butyl-5-chloro-2-phenoxy) titanium dichloride, diphenylmethylene(methylcyclopentadienyl)(3,5-dimethyl-2-phenoxy)titanium dichloride, diphenylmethylene (methylcyclopentadienyl)(3-tert-butyl-2-phenoxy)titanium dichloride, diphenylmethylene (methylcyclopentadienyl)(3-tert-butyl-5-methyl-2-phenoxy)titanium dichloride, diphenylmethylene (methylcyclopentadienyl)(3-phenyl-2-phenoxy) titanium dichloride, diphenylmethylene (methylcyclopentadienyl) (3-tert-butyldimethylsilyl-5-methyl-2-phenoxy)titanium dichloride, diphenylmethylene (methylcyclopentadienyl) (3-trimethylsilyl-5-methyl-2-phenoxy)titanium dichloride, diphenylmethylene (methylcyclopentadienyl)(3-tert-butyl-5-methoxy-2-phenoxy)titanium dichloride, diphenylmethylene (methylcyclopentadienyl)(3-tert-butyl-5-chloro-2-phenoxy)titanium dichloride, diphenylmethylene (tert-butylcyclopentadienyl)(3,5-dimethyl-2-phenoxy)titanium dichloride, diphenylmethylene (tert-butylcyclopentadienyl)(3-tert-butyl-2-phenoxy)titanium dichloride, diphenylmethylene (tert-butylcyclopentadienyl)(3-tert-butyl-5-methyl-2-phenoxy)titanium dichloride,
diphenylmethylene (tert-butylcyclopentadienyl)(3-phenyl2-phenoxy)titanium dichloride, diphenylmethylene (tert-butylcyclopentadienyl)(3-tert-butyldimethylsilyl-5methyl-2-phenoxy)titanium dichloride,
diphenylmethylene (tert-butylcyclopentadienyl)(3-trimethylsilyl-5-methyl-2-phenoxy)titanium dichloride,
diphenylmethylene (tert-butylcyclopentadienyl)(3-tert-butyl-5-methoxy-2-phenoxy)titanium dichloride,
diphenylmethylene (tert-butylcyclopentadienyl)(3-tert-butyl-5-chloro-2-phenoxy)titanium dichloride,
diphenylmethylene (tetramethylcyclopentadienyl)(3,5-dimethyl-2-phenoxy)titanium dichloride,
diphenylmethylene (tetramethylcyclopentadienyl)(3-tert-butyl-2-phenoxy)titanium dichloride,
diphenylmethylene (tetramethylcyclopentadienyl)(3-tert-butyl-5-methyl-2-phenoxy)titanium dichloride,
diphenylmethylene (tetramethylcyclopentadienyl)(3-phenyl-2-phenoxy)titanium dichloride,
diphenylmethylene (tetramethylcyclopentadienyl)(3-tert-butyldimethylsilyl 5-methyl-2-phenoxy)titanium-dichloride,
diphenylmethylene (tetramethylcyclopentadienyl)(3-trimethylsilyl-5-methyl 2-phenoxy)titanium dichloride,
diphenylmethylene (tetramethylcyclopentadienyl)(3-tert-butyl-5-methoxy-2 phenoxy)titanium dichloride,
diphenylmethylene (tetramethylcyclopentadienyl)(3-tert-butyl-5-chloro-2phenoxy)titanium dichloride,
diphenylmethylene (trimethylsilylcyclopentadienyl)(3,5-dimethyl-2-phenoxy)titanium dichloride,
diphenylmethylene (trimethylsilylcyclopentadienyl)(3-tert-butyl-2-phenoxy)titanium dichloride,
diphenylmethylene (trimethylsilylcyclopentadienyl)(3-tert-butyl-5-methyl-2-phenoxy)titanium dichloride,
diphenylmethylene (trimethylsilylcyclopentadienyl)(3-phenyl-2-phenoxy)titanium dichloride,
diphenylmethylene (trimethylsilylcyclopentadienyl)(3-tert-butyldimethylsilyl-5-methyl-2-phenoxy)titanium dichloride,
diphenylmethylene (trimethylsilylcyclopentadienyl) (3trimethylsilyl-5-methyl-2-phenoxy)titanium dichloride,
diphenylmethylene (trimethylsilylcyclopentadienyl) (3tert-butyl-5-methoxy-2-phenoxy)titanium dichloride,
diphenylmethylene (trimethylsilylcyclopentadienyl)(3-tert-butyl-5-chloro-2-phenoxy)titanium dichloride,
diphenylmethylene (fluorenyl)(3,5-dimethyl-2-phenoxy) titanium dichloride,
diphenylmethylene (fluorenyl)(3-tert-butyl-2-phenoxy) titanium dichloride,
diphenylmethylene (fluorenyl)(3-tert-butyl-5-methyl-2-phenoxy)titanium dichloride, diphenylmethylene (fluorenyl)(3-phenyl-2-phenoxy)titanium dichloride,
diphenylmethylene (fluorenyl) (3-tert-butyldimethylsilyl-5-methyl-2-phenoxy)titanium dichloride,
diphenylmethylene (fluorenyl)(3-trimethylsilyl-5-methyl-2-phenoxy)titanium dichloride, diphenylmethylene (fluorenyl) (3-tent-butyl-5-metboxy-2-phenoxy) titanium dichloride, or diphenylmethylene (fluorenyl) (3-tert-butyl-5-chloro-2-phenoxy)titanium dichloride, etc.

The transition metal complexes wherein J in the chemical formula [I] is a carbon atom include such compounds wherein titanium in the compounds is replaced by zirconium or hafnium; compounds wherein the dichloride of these compounds is replaced by dibromide, diiodide, bis (dimethylamide), bis(diethylamide), di-n-butoxide or diisopropoxide; compounds wherein cyclopentadienyl of these compounds is replaced by dimethylcyclopentadienyl, trimethylcyclopentadienyl, n-butylcyclopentadienyl, tert-butyldimethylsilylcyclopentadienyl or indenyl; and compounds wherein the 3,5-dimethyl-2-phenoxy of these compounds is replaced by 2-phenoxy, 3-methyl-2-phenoxy, 3,5-di-tert-butyl-2-phenoxy, 3-phenyl-5-methyl-2-phenoxy, 3tert-butyldimethylsilyl-2-phenoxy or 3-trimethylsilyl-2-phenoxy; and dimethylsilyl(cyclopentadienyl)(2-phenoxy) titanium dichloride, dimethylsilyl(cyclopentadienyl)(3-methyl-2-phenoxy)titanium dichloride, dimethylsilyl (cyclopentadienyl)(3,5-dimethyl-2-phenoxy)titanium dichloride, dimethylsilyl(cyclopentadienyl)(3-tert-butyl-2-phenoxy)titanium dichloride, dimethylsilyl (cyclopentadienyl)(3-tert-butyl-5-methyl-2-phenoxy) titanium dichloride, dimethylsilyl(cyclopentadienyl)(3,5-di-tert-butyl-2-phenoxy)titanium dichloride, dimethylsilyl (cyclopentadienyl)(5-methyl-3-phenyl-2-phenoxy)titanium dichloride, dimethylsilyl(cyclopentadienyl)(3-tert-butyldimethylsilyl-5-methyl-2-phenoxy)titanium dichloride, dimethylsilyl(cyclopentadienyl)(5-methyl-3-trimethylsilyl-2-phenoxy)titanium dichloride, dimethylsilyl (cyclopentadienyl)(3-tert-butyl-5-methoxy-2-phenoxy) titanium dichloride, dimethylsilyl(cyclopentadienyl)(3-tert-butyl-5-chloro-2-phenoxy)titanium dichloride, dimethylsilyl(cyclopentadienyl)(3,5-diamyl-2-phenoxy) titanium dichloride, dimethylsilyl(methylcyclopentadienyl) (2-phenoxy)titanium dichloride, dimethylsilyl (methylcyclopentadienyl)(3-methyl-2-phenoxy)titanium dichloride, dimethylsilyl(methylcyclopentadienyl)(3,5-dimethyl-2-phenoxy)titanium dichloride, dimethylsilyl (methylcyclopentadienyl)(3-tert-butyl-2-phenoxy)titanium dichloride, dimethylsilyl(methylcyclopentadienyl)(3-tert-butyl-5-methyl-2-phenoxy)titanium dichloride, dimethylsilyl(methylcyclopentadienyl)(3,5-di-tert-butyl-2-phenoxy)titanium dichloride, dimethylsilyl (methylcyclopentadienyl)(5-methyl-3-phenyl-2-phenoxy) titanium dichloride, dimethylsilyl(methylcyclopentadienyl) (3-tert-butyldimethylsilyl-5-methyl-2-phenoxy)titanium dichloride, dimethylsilyl(methylcyclopentadienyl)(5-methyl-3-trimethylsilyl-2-phenoxy)titanium dichloride, dimethylsilyl(methylcyclopentadienyl)(3-tert-butyl-5-methoxy-2-phenoxy)titanium dichloride, dimethylsilyl (methylcyclopentadienyl)(3-tert-butyl-5-chloro-2-phenoxy) titanium dichloride, dimethylsilyl(methylcyclopentadienyl) (3,5-diamyl-2-phenoxy)titanium dichloride, dimethylsilyl (n-butylcyclopentadienyl)(2-phenoxy)titanium dichloride, dimethylsilyl(n-butylcyclopentadienyl)(3-methyl-2-phenoxy)titanium dichloride, dimethylsilyl(n-butylcyclopentadienyl)(3,5-dimethyl-2-phenoxy)titanium dichloride, dimethylsilyl(n-butylcyclopentadienyl)(3-tert-butyl-2-phenoxy)titanium dichloride, dimethylsilyl(n-butylcyclopentadienyl)(3-tert-butyl-5-methyl-2-phenoxy) titanium dichloride, dimethylsilyl(n-butylcyclopentadienyl) (3,5-di-tert-butyl-2phenoxy)titanium dichloride, dimethylsilyl(n-butylcyclopentadienyl)(5-methyl-3-phenyl-2-phenoxy)titanium dichloride, dimethylsilyl(n-butylcyclopentadienyl)(3-tert-butyldimethylsilyl-5-methyl-2-phenoxy)titanium dichloride, dimethylsilyl(n-butylcyclopentadienyl)(5-methyl-3-trimethylsilyl-2-phenoxy)titanium dichloride, dimethylsilyl(n- butylcyclopentadienyl)(3-tert-butyl-5-methoxy-2-phenoxy) titaium dichloride, dimethylsilyl(n-butylcyclopentadienyl) (3-tert-butyl-5-chloro-2-phenoxy)titanium dichloride, dimethylsilyl(n-butylcyclopentadienyl)(3,5-diamyl-2-phenoxy)titanium dichloride, dimethylsilyl(tert-butylcyclopentadienyl)(2-phenoxy)titanium dichloride, dimethylsilyl(tert-butylcyclopentadienyl)(3-methyl-2-phenoxy)titanium dichloride, dimethylsilyl(tert-butylcyclopentadienyl)(3,5-dimethyl-2-phenoxy)titanium dichloride, dimethylsilyl(tert-butylcyclopentadienyl)(3-tert-butyl-2-phenoxy)titanium dichloride, dimethylsilyl(tert-butylcyclopentadienyl)(3-tert-butyl-5-methyl-2-phenoxy) titanium dichloride, dimethylsilyl(tert-butylcyclopentadienyl)(3,5-di-tert-butyl-2-phenoxy) titanium dichloride, dimethylsilyl(tert-butylcyclopentadienyl)(5-methyl-3-phenyl-2-phenoxy) titanium dichloride, dimethylsilyl(tert-butylcyclopentadienyl)(3-tert-butyldimethylsilyl-5-methyl-2-phenoxy)titanium dichloride, dimethylsilyl(tert-butylcyclopentadienyl(5-methyl-3-trimethylsilyl-2-phenoxy) titanium dichloride, dimethylsilyl(tert-butylcyclopentadienyl)(3-tert-butyl-5-methoxy-2-phenoxy) titanium dichloride, dimethylsilyl(tert-butylcyclopentadienyl)(3-tert-butyl-5-chloro-2-phenoxy) titanium dichloride, dimethylsilyl(tert-butylcyclopentadienyl)(3,5-diamyl-2-phenoxy)titanium dichloride, dimethylsilyl(tetramethylcyclopentadienyl)(2-phenoxy)titanium dichloride, dimethylsilyl (tetramethylcyclopentadienyl)(3-methyl-2-phenoxy) titanium dichloride, dimethylsilyl (tetramethylcyclopentadienyl)(3,5-dimethyl-2-phenoxy) titanium dichloride, dimethylsilyl (tetramethylcyclopentadienyl)(3-tert-butyl-2-phenoxy) titanium dichloride, dimethylsilyl (tetramethylcyclopentadienyl)(3-tert-butyl-5-methyl-2-phenoxy) titanium dichloride, dimethylsilyl (tetramethylcyclopentadienyl)(3,5-di-tertbutyl-2-phenoxy) titanium dichloride, dimethylsilyl (tetramethylcyclopentadienyl)(5-methyl-3-phenyl-2-phenoxy)titanium dichloride, dimethylsilyl (tetramethylcyclopentadienyl)(3-tert-butyldimethylsilyl-5-methyl-2-phenoxy)titanium dichloride, dimethylsilyl (tetramethylcyclopentadienyl)(5-methyl-3-trimethylsilyl-2-phenoxy)titanium dichloride, dimethylsilyl (tetramethylcyclopentadienyl)(3-tert-butyl-5-methoxy-2-phenoxy)titanium dichloride, dimethylsilyl (tetramethylcyclopentadienyl)(3-tert-butyl-5-chloro-2-phenoxy)titanium dichloride, dimethylsilyl (tetramethylcyclopentadienyl)(3,5-diamyl-2-phenoxy) titanium dichloride, dimethylsilyl(trimethylsilyl (trimethylsilylcyclopentadienyl)(2-phenoxy)titanium dichloride, dimethylsilyl(trimethylsilylcyclopentadienyl)(3-methyl-2-phenoxy)titanium dichloride, dimethylsilyl (trimethylsilylcyclopentadienyl)(3,5-dimethyl-2-phenoxy) titanium dichloride, dimethylsilyl (trimethylsilylcyclopentadienyl)(3-tert-butyl-2-phenoxy) titanium dichloride, dimethylsilyl (trimethylsilylcyclopentadienyl)(3-tert-butyl-5-methyl-2-phenoxy)titanium dichloride, dimethylsilyl (trimethylsilylcyclopentadienyl(3,5-di-tert-butyl-2-phenoxy)titanium dichloride, dimethylsilyl (trimethylcyclopentadienyl)(5-methyl-3-phenyl-2-phenoxy) titanium dichloride, dimethylsilyl (trimethylsilylcyclopentadienyl)(3-tert-butyldimethylsilyl-5-methyl-2-phenoxy)titanium dichloride, dimethylsilyl (trimethylsilylcyclopentadienyl)(5-methyl-3-trimethylsilyl-2-phenoxy)titanium dichloride, dimethylsilyl (trimethylsilylcyclopentadienyl)(3-tert-butyl-5-methoxy-2-phenoxy)titanium dichloride, dimethylsilyl (trimethylsilylcyclopentadienyl)(3-tert-butyl-5-chloro-2-phenoxy)titanium dichloride, dimethylsilyl (trimethylsilylcyclopentadienyl)(3,5-diamyl-2-phenoxy) titanium dichloride, dimethylsilyl(indenyl)(2-phenoxy) titanium dichloride, dimethylsilyl(indenyl)(3-methyl-2-phenoxy)titanium dichloride, dimethylsilyl(indenyl)(3,5-dimethyl-2-phenoxy)titanium dichloride, dimethylsilyl (indenyl)(3-tert-butyl-2-phenoxy)titanium dichloride, dimethylsilyl(indenyl)(3-tert-butyl-5-methyl-2-phenoxy) titanium dichloride, dimethylsilyl(indenyl)(3,5-di-tert-butyl-2-phenoxy)titanium dichloride, dimethylsilyl(indenyl) (5-methyl-3-phenyl-2-phenoxy)titanium dichloride, dimethylsilyl(indenyl)(3-tert-butyldimethylsilyl-5-methyl-2-phenoxy)titanium dichloride, dimethylsilyl(indenyl)(5-methyl-3-trimethylsilyl-2-phenoxy)titanium dichloride, dimethylsilyl(indenyl)(3-tert-butyl-5-methoxy-2-phenoxy) titanium dichloride, dimethylsilyl(indenyl)(3-tert-butyl-5-chloro-2-phenoxy)titanium dichloride, dimethylsilyl (indenyl)(3,5-diamyl-2-phenoxy)titanium dichloride, dimethylsilyl(fluorenyl)(2-phenoxy)titanium dichloride, dimethylsilyl(fluorenyl)(3-methyl-2-phenoxy)titanium dichloride, dimethylsilyl(fluorenyl)(3,5-dimethyl-2-phenoxy)titanium dichloride, dimethylsilyl(fluorenyl)(3-tert-butyl-2-phenoxy)titanium dichloride, dimethylsilyl (fluorenyl)(3-tert-butyl-5-methyl-2-phenoxy)titanium dichloride, dimethylsilyl(fluorenyl)(3,5-di-tert-butyl-2-phenoxy)titanium dichloride, dimethylsilyl(fluorenyl)(5-methyl-3-phenyl-2-phenoxy)titanium dichloride, dimethylsilyl(fluorenyl)3-tert-butyldimethylsilyl-5-methyl-2-phenoxy)titanium dichloride, dimethylsilyl(fluorenyl)(5-methyl-3-trimethylsilyl-2-phenoxy)titanium dichloride, dimethylsilyl(fluorenyl)(3-tert-butyl-5-methoxy-2-phenoxy)titanium dichloride, dimethylsilyl(fluorenyl)(3-tert-butyl5-chloro-2-phenoxy)titanium dichloride, dimethylsilyl(fluorenyl)(3,5-dimaryl-2-phenoxy)titanium dichloride, or dimethylsilyl(tetramethylcyclopentadienyl) (1-naphthoxy-2-il)titanium dichloride, etc.; the compounds wherein the (cyclopentadienyl) of these compounds has (have) been changed to (dimethylcyclopentadienyl), (trimethylcyclopentadienyl), (ethylcyclopentadienyl), (n-propylcyclopentadienyl), (isopropylcyclopentadienyl), (sec-butylcyclopentadienyl), (isobutylcyclopentadienyl), (tert-butyldimethylsilylcyclopentadienyl), (phenylcyclopentadienyl), (methylindenyl), or (phenylindenyl); the compounds wherein (2-phenoxy) has been changed to (3-phenyl 2-phenoxy), (3-trimethylsilyl-2-phenoxy), or (3-tert-butyldimethylsilyl-2-phenoxy), etc.; the compounds wherein dimethyl silyl has been changed to diethyl silyl, diphenyl silyl, or dimethoxy silyl; the compounds wherein titanium has been changed to zirconium or hafnium; the compounds wherein dichloride has been changed to dibromide, diiodide, bis(dimethylamide), bis (diethylamide), di-n-buthoxide, or diisopropoxide, which are transition metal complexes wherein J in the chemical formula [I] is an atom of the group XIV in the Periodic Table of the Elements other than the carbon atoms.

Examples of the transition metal complex represented by the general formula [II] include $\mu$-oxo bis{isopropylidene(cyclopentadienyl)(2-phenoxy) titanium chloride}, $\mu$-oxo bis{isopropylidene (cyclopentadienyl)(2-phenoxy)titanium methoxide}, $\mu$-oxo bis{isopropylidene(cyclopentadienyl)(3-tert-butyl-5-methyl-2-phenoxy)titanium dichloride}, $\mu$-oxo bis{isopropylidene(cyclopentadienyl)(3-tert-butyl-5-methyl-2-phenoxy)titanium methoxide}, $\mu$-oxo bis{isopropylidene(methylcyclopentadienyl)(2-phenoxy)titanium chloride}, μ-oxo bis{isopropylidene(methylcyclopentadienyl)(2-phenoxy)titanium methoxide}, μ-oxo bis{isopropylidene(methylcyclopentadienyl)(3-tert-butyl-5-methyl-2-phenoxy)titanium chloride}, μ-oxo bis{isopropylidene(methylcyclopentadienyl)(3-tertbutyl-5-methyl-2-phenoxy)titanium methoxide}, μ-oxo bis{isopropylidene(tetramethylcyclopentadienyl)(2-phenoxy)titanium chloride}, μ-oxo bis{isopropylidene(tetramethylcyclopentadienyl)(2-phenoxy)titanium methoxide}, μ-oxo bis{isopropylidene(tetramethylcyclopentadienyl)(3-tert-butyl-5-methyl-2-phenoxy)titanium chloride}, μ-oxo bis{isopropylidene(tetramethylcyclopentadienyl)(3tert-butyl-5-methyl-2-phenoxy)titanium methoxide}, μ-oxo bis{dimethylsilylene(cyclopentadienyl)(2-phenoxy)titanium chloride}, μ-oxo bis{dimethylsilylene(cyclopentadienyl)(2-phenoxy)titanium methoxide}, μ-oxo bis{dimethylsilylene(cyclopentadienyl)(3-tert-butyl-5-methyl-2-phenoxy)titanium chloride}, μ-oxo bis{dimethylsilylene(cyclopentadienyl)(3-tertbutyl-5-methyl-2-phenoxy)titanium methoxide}, μ-oxo bis{dimethylsilylene(methylcyclopentadienyl)(2-phenoxy)titanium chloride}, μ-oxo bis{dimethylsilylene(methylcyclopentadienyl)(2-phenoxy)titanium methoxide}, μ-oxo bis{dimethylsilylene(methylcyclopentadienyl)(3-tert-butyl-5-methyl-2-phenoxy)titanium chloride}, μ-oxo bis{dimethylsilylene(methylcyclopentadienyl(3-tert-butyl-5-methyl-2-phenoxy)titanium methoxide}, μ-oxo bis{dimethylsilylene(methylcyclopentadienyl)(2-phenoxy)titanium chloride}, μ-oxo bis{dimethylsilylene(tetramethylcyclopentadienyl)(2-phenoxy)titanium methoxide}, μ-oxo bis{dimethylsilylene(tetramethylcyclopentadienyl)(3-tert-butyl-5-methyl-2-phenoxy)titanium chloride} and μ-oxo bis{dimethylsilylene(tetramethylcyclopentadienyl)(3-tert-butyl-5-methyl-2-phenoxy)titanium methoxide}.

Examples of the transition metal complex represented by the general formula [III] include:

di-μ-oxo bis{isopropylidene(cyclopentadienyl)(2-phenoxy)titanium}, di-μ-oxo bis{isopropylidene(cyclopentadienyl)(3-tert-butyl-5-methyl-2-phenoxy)titanium}, di-μ-oxo bis{isopropylidene(methylcyclopentadienyl(2-phenoxy)titanium}, di-μ-oxo bis{isopropylidene(methylcyclopentadienyl)(3tert-butyl-5-methyl-2-phenoxy)titanium}, di-μ-oxo bis{isopropylidene(tetramethylcyclopentadienyl)(2-phenoxy)titanium}, di-μ-oxo bis{isopropylidene(tetramethylcyclopentadienyl)(3-tertbutyl-5-methyl-2-phenoxy)titanium}, di-μ-oxo bis{dimethylsilylene(cyclopentadienyl)(2-phenoxy)titanium}, di-μ-oxo bis{dimethylsilylene(cyclopentadienyl)(3-tertbutyl5-methyl-2-phenoxy)titanium}, di-μ-oxo bis{dimethylsilylene(methylcyclopentadienyl)(2-phenoxy)titanium}, di-μ-oxo bis{dimethylsilylene(methylcyclopentadienyl)(3-tert-butyl-5-methyl-2-phenoxy)titanium}, di-μ-oxo bis{dimethylsilylene(tetramethylcyclopentadienyl)(2-phenoxy)titanium} and di-μ-oxo bis{dimethylsilylene(tetramethylcyclopentadienyl)(3-tert-butyl-5-methyl-2-phenoxy)titanium}.

The transition metal complex represented by the general formula [I] can be synthesized according to the method described in WO 97/03992, which is incorporated herein by reference in its entirety.

The transition metal compound represented by the general formula [II] or [III] can be prepared by reacting a transition metal compound [I] with 1 or 2 equivalent amounts of water or oxygen.

Next, aluminum compound (B) is one or more of aluminum compounds selected from (B1)–(B3):

(B1) represents an organoaluminum compound represented by the general formula $$E^1_a AlZ_{3-a},$$

(B2) represents a cyclic aluminoxane having a structure represented by the general formula $$\{-Al(E^2)-O-\}_b$$

and (B3) represents a linear aluminoxane having a structure represented by the general formula $$E^3\{-Al(E^3)-O-\}_c AlE^3_2,$$

wherein $E^1$, $E^2$ and $E^3$ respectively represent a hydrocarbon group and all of $E^1$, $E^2$ and $E^3$ may be the same or different; Z represents a hydrogen atom or a halogen atom and all of Z may be the same or different; the value a satisfies the following equation: $0<a\leq 3$; the value b represents an integer of 2 or more; and the value c represents an integer of 1 or more.

The hydrocarbon group in $E^1$, $E^2$ and $E^3$ is preferably a hydrocarbon group having 1–8 carbon atoms and an alkyl group is more preferred.

Specific examples of the organoaluminum compound (B1) represented by the general formula $E^1_a AlZ_{3-a}$ include trialkylaluminum such as trimethylaluminum, triethylaluminum, tripropylaluminum, triisobutylaluminum, trihexylaluminum, etc.; dialkylaluminum chloride such as dimethylaluminum chloride, diethylaluminum chloride, dipropylaluminum chloride, diisobutylaluminum chloride, dihexylaluminum chloride, etc.; alkylaluminum dichloride such as methylaluminum dichloride, ethylaluminum dichloride, propylaluminum dichloride, isobutylaluminum dichloride, hexylaluminum dichloride, etc.; and dialkylaluminum hydride such as dimethylaluminum hydride, diethylaluminum hydride, dipropylaluminum hydride, diisobutylaluminum hydride, dihexylaluminum hydride, etc. Among these, trialkylaluminum is preferred, and triethylaluminum and triisobutylaluminum are more preferred.

Specific examples of $E^2$ and $E^3$ in the cyclic aluminoxane (B2) having a structure represented by the general formula $\{-Al(E^2)-O-\}_b$ and the linear aluminoxane (B3) having a structure represented by the general formula $E^3\{-Al(E^3)-O-\}_c AlE^3_2$ include alkyl groups such as methyl, ethyl, n-propyl, isopropyl, n-butyl, isobutyl, n-pentyl, neopentyl, and the like. The value b is an integer of not less than 2, and the value c is an integer of not less than 1. $E^2$ and $E^3$ are preferably methyl groups or isobutyl groups, b is preferably 2 to 40 and c is preferably 1 to 40.

The above aluminoxane is produced by various methods. The method is not specifically limited, and the aluminoxane may be produced according to known methods. For example, it can be produced by bringing a solution prepared by dissolving a trialkylaluminum (e.g., trimethylaluminum, etc.) in a suitable solvent (e.g. benzene, aliphatic hydrocarbon, etc.), into contact with water. A method involving bringing a trialkylaluminum (e.g., trimethylaluminum, etc.) into contact with a metal salt containing crystallization water (e.g., copper sulfate hydrate, etc.) can also be used.

As the boron compound (C), any one of the boron compound (C1) represented by the general formula $BQ^1Q^2Q^3$, the boron compound (C2) represented by the general formula $G^+(BQ^1Q^2Q^3Q^4)^-$ and the boron compound (C3) represented by the general formula $(L—H)^+(BQ^1Q^2Q^3Q^4)^-$ can be used.

In the boron compound (C1) represented by the general formula $BQ^1Q^2Q^3$, B represents a trivalent boron atom in the valence state; and $Q^1$ to $Q^3$ may be the same or different and represent a halogen atom, a hydrocarbon group, a halogenated hydrocarbon group, a substituted silyl group, an alkoxy group or a disubstituted amino group. $Q^1$ to $Q^3$ preferably represent a halogen atom, a hydrocarbon group having 1–20 carbon atoms, a halogenated hydrocarbon group having 1–20 carbon atoms, a substituted silyl group having 1–20 carbon atoms, an alkoxy group having 1–20 carbon atoms or a disubstituted amino group having 2–20 carbon atoms. $Q^1$ to $Q^3$ represent more preferably a halogen atom, a hydrocarbon group having 1–20 carbon atoms or a halogenated hydrocarbon group having 1–20 carbon atoms. Further, $Q^1$ to $Q^4$ more preferably represent a fluorinated hydrocarbon group having 1–20 carbon atoms and having at least one fluorine atom. $Q^1$ to $Q^4$ represent especially preferably a fluorinated aryl group having 6–20 carbon atoms and having at least one fluorine atom.

Specific examples of the compound (C1) include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenylbis(pentafluorophenyl)borane, etc. Among these, tris(pentafluorophenyl)borane is most preferred.

In the boron compound (C2) represented by the general formula $G^+(BQ^1Q^2Q^3Q^4)^-$, $G^+$ represents an inorganic or organic cation; B represents a trivalent boron in the valence state; and $Q^1$ and $Q^4$ are the same as $Q^1$ and $Q^3$ in the above (C1).

In the compound represented by the general formula $G^+(BQ^1Q^2Q^3Q^4)^-$, specific examples of $G^+$ as an inorganic cation include a ferrocenium cation, an alkyl substituted ferrocenium cation, and a silver cation, etc. Specific examples of $G^+$ as an organic cation include triphenylmethyl cation, etc. $G^+$ preferably a carbenium cation, and more preferably is a triphenylmethyl cation.

Examples of $(BQ^1Q^2Q^3Q^4)^-$ include tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,3,4-trifluorophenyl)borate, phenyl tris(pentafluorophenyl)borate, tetrakis(3,5-bistrifluorophenylmethyl)borate and the like.

Examples of the specific combination of them include ferrocenium tetrakis(pentafluorophenyl)borate, 1,1'dimethylferrocenium tetrakis(pentafluorophenyl)borate, silver tetrakis(pentafluorophenyl)borate, triphenylmethyl tetrakis(pentafluorophenyl)borate, triphenylmethyl tetrakis(3,5-bistrifluorophenyl)borate and the like. Among these, triphenylmethyl tetrakis(pentafluorophenyl)borate is most preferable.

In the compound (C3), which is represented by the general formula $(L—H)^+(BQ^1Q^2Q^3Q^4)^-$, L prints a neutral Lewis base; $(L—H)^+$ represents a Bronsted acid; B represents a trivalent boron in the valence state; and $Q^1$ to $Q^4$ are the same as $Q^1$ to $Q^3$ in the above (C1).

In the compound represented by this general formula, specific examples of $(L—H)^+$ as Bronsted acid include trialkyl-substituted ammonium N,N-dialkylanilinium, dialkylammonium, triarylphosphonium, etc. Specific examples of $(BQ^1Q^2Q^3Q^4)^-$ include the same ones as described above.

Examples of the specific combination of them include
triethylammonium tetrakis(pentafluorophenyl)borate, tripropylammonium tetrakis(pentafluorophenyl)borate, tri(n-butyl)ammonium tetrakis(pentafluorophenyl)borate, tri(n-butyl)ammonium tetrakis(3,5-bistrifluoromethylphenyl)borate, N,N-dimethylanilium tetrakis(pentafluorophenyl)borate, N,N-dimethylanilium tetrakis(pentafluorophenyl)borate, N,N-2,4,6-pentamethylanilium tetrakis(pentafluorophenyl)borate, N,N-dimethylanilium tetrakis(3,5-bistrifluoromethylphenyl)borate, diisopropylammonium tetrakis(pentafluorophenyl)borate, dicyclohexylammonium tetrakis(pentafluorophenyl)borate, triphenylphosphonium, tetrakis(pentafluorophenyl)borate, tri(methylphenyl)phosphonium tetrakis(pentafluorophenyl)borate, and tri(dimethylphenyl)phosphonium tetrakis(pentafluorophenyl)borate, etc. Among these, tri(nbutyl)ammonium tatrakis(pentafluoro)borate or N,Ndimethylanilinium tetrakis(pentafluorophenyl)borate is most preferable.

In copolymerizing, a catalyst used for olefin polymerization comprises the transition metal complex (A) represented by the general formula (I) and the above-mentioned compound(s) (B) and/or (C). When using a catalyst for olefin polymerization comprising the two components of (A) and (B), preferable compounds (B) are the above-mentioned cyclic aluminoxane (B2) and/or the linear aluminoxane (B3). As the other preferable mode, a catalyst for olefin polymerization comprises (A), (B) and (C), wherein (B1) is preferable.

Each catalyst component is used so that a molar ratio of (B) to (A) is preferably from 0.1 to 10000, more preferably from 5 to 2000, and a molar ratio of (C) to (A) is preferably from 0.01 to 100, more preferably from 0.5 to 20.

With regard to the concentration of each catalyst component used in the state of a solution or in a state of suspension in the solvent, optional selection is made depending on the capacity of the apparatus for supplying each component to the polymerization reactor and the like. Each component is used so that an amount of (A) is preferably from 0.01 to 500, $\mu$ mol/g, more preferably from 0.05 to 100, $\mu$ mol/g, further preferably from 0.05 to 50 $\mu$ mol/g, an amount of (B) is preferably from 0.01 to 10000 $\mu$ mol/g, more preferably from 0.1 to 5000 $\mu$ mol/g, further preferably from 0.1 to 2000, $\mu$ mol/g, in terms of the aluminum atom, and an amount of (C) is preferably from 0.01 to 500, $\mu$ mol/g, more preferably from 0.05 to 200, $\mu$ mol/g, further still preferably from 0.05 to 100 $\mu$ mol/g.

For producing the copolymer (ii), solvent polymerization using an aliphatic hydrocarbon such as butane, pentane, hexane, heptane, octane and the like, an aromatic hydrocarbon such as benzene, toluene and the like, or a halogenated hydrocarbon such as methylene dichloride and the like, or slurry polymerization, gas-phase polymerization in a gaseous monomer can be applied. And any of continuous polymerization and batch-wise polymerization can be used. The polymerization reaction can be in the range from −50 to 200° C., and particularly, it is preferably in the range of −20 to 100° C., the polymerization pressure is preferably atmospheric pressure to 60 kg/cm$^2$G. The polymerization time is usually determined appropriately depending on the kind of a catalyst used and a reaction apparatus, and it can be in the range from 1 minute to 20 hours. Further, for controlling molecular weight of a polymer, a chain transfer agent such as hydrogen and the like can also be added.

The resin composition pellet of the present invention is a resin composition pellet comprising 15 to 65% by weight of the resin (i) and 85 to 35% by weight of the copolymer (ii). Preferably it comprises 20 to 45% by weight of the resin (i) and 80 to 55% by weight of the copolymer (ii). When amount of the resin (i) is too low (amount of the copolymer (ii) is too high), the pellets may adhere to one another. On the other hand, when amount of the resin (i) is too high (amount of the copolymer (ii) is too low), the amount of the pellet required for impairing flexibility and transparency to a polyolefin-based resin may increase, whereby the property of a polyolefin-based resin before addition may not be manifested easily or may not reach the required flexibility and transparency.

The resin composition pellet can be formed m different forms (shapes), of which a sphere, cylinder, lens and cube are examples. These shapes can be produced according to a known pelletizing method, and for example, a spherical, cylindrical or lens-form pellet is obtained by melt-mixing the resin (i) and the copolymer (ii) uniformly and extruding the mixture by an extruder then, hot-cutting or strand-cutting the extruded material. In this case, the cutting may be effected in any of water, gas flow such as air, and the like. Further, an extruder having an apparatus, which can provide the strand outer layer and the strand inner layer constituted of different polymers respectively can be used, in which case a strand having two-layer structure in which the resin (i) is provided as the outer layer and the copolymer (ii) is provided as the inner layer can be obtained. When this strand is cut, mutual adhesion can be further effectively suppressed. A cubic pellet can be obtained, for example, by uniformly mixing the raw material, then molding it into a sheet by a roll and the like, and using a sheet-pelletizing machine. Regarding the size, the length of the most long part of a pellet is preferably 3 cm or less. In the case of a pellet having a size over this range, measurement error may increase. It is preferred that one or more of calcium carbonate, barium sulfate, silica, talc, stearic acid and polyolefin powder are dusted on the surface of the pellet, from the standpoint of further suppression of mutual adhesion or suppression of bridging phenomenon of a pellet in removal from a silo and the like. The amount of dusting may be selected depending on size and form of the pellet, and usually it is added in an amount of 0.05 to 3 parts by weight based on the resin composition pellet. When the amount added is too low, mutual adhesion may not be further suppressed, and when too high, physical properties lower and production costs may increase. In particular, when transparency of a polyolefin-based copolymer to be obtained is important, it is preferable to use a polyolefin powder. As the polyolefin powder, powders of polyethylene-based resins and polypropylene-based resins are listed.

The average particle size of the polyolefin powder is preferably 500 μm or less, particularly preferably 300 μm or less. When the particle size is large, it can not adhere to the surface of the pellet and mutual adhesion improving effect may not be obtained.

If necessary, a nucleating agent, clearing agent, heat-resistant stabilizer, ultraviolet ray stabilizer, weather resist stabilizer, foaming agent, antifogging agent, preservative, ion-trapping agent, flame retardant, flame retardant aid, inorganic filler, organic pigment, inorganic pigment and the like can be added to the resin composition pellet. Further, there can be added resins and rubber other than the component (i) such as a polyethylene-based resin, polypropylene-based resin, polybutene-1, petroleum resin, ethylene/propylene copolymer elastomer, ethylene-propylene copolymer rubber, ethylene-propylene-nonconjugated diene copolymer rubber, ethylene-1-butene copolymer rubber, polybutadiene, styrene-butadiene block copolymer rubber, styrene-butadiene-styrene block copolymer rubber, styrene-butadiene random copolymer rubber, partially hydrogenated styrene-butadiene-styrene block copolymer rubber, partially hydrogenated styrene-butadiene random copolymer rubber, styrene-isoprene block copolymer rubber, partially hydrogenated styrene-isoprene copolymer rubber and the like, in an amount which does not lose the abilities of the pellet of the present invention.

Further, if necessary, the resin composition of the present invention can also be subjected to cross-linking such as sulfur cross-linking, peroxide cross-linking, metal ion cross-linking, silane cross-linking and the like by a conventionally known method.

As a preferable method for obtaining the resin composition pellet, resin (i) and copolymer (ii) are kneaded at a temperature not lower than the maximum peak temperature (Tm) in measurement by differential scanning calorimetry (DSC) and not higher than 280° C. When the temperature during kneading is too low, the resin (i) and the copolymer (ii) may not be mixed uniformly, which leads to a pellet having uneven mutual adhesion, on the other hand when the temperature is too high, heat resistance of the resulting polyolefin-based copolymer may decrease.

The resin composition pellet of the present invention can be used as a modifier for a polyolefin-based resin.

As the polyolefin-based resin to be modified, there can be exemplified high density polyethylene, medium density polyethylene, low density polyethylene, LLDPE (linear low density polyethylene), polypropylene-based resins, poly-4-methyl-pentene-1 and the like. Preferable are polypropylene-based resins.

The polypropylene-based resin used in this case is a crystalline polypropylene-based resin, and is a homopolymer of propylene or a random or block copolymer of propylene with a small amount of α-olefin and/or ethylene. If the above-described polypropylene-based resin is a random copolymer, the copolymerization proportion of other α-olefin and/or ethylene in the copolymer is generally 10% by weight or less, preferably from 0.5 to 7% by weight in total. If it is a block copolymer, the copolymerization proportion of other α-olefin and/or ethylene in the copolymer is generally from 1 to 40% by weight, preferably from 1 to 25% by weight, further from 2 to 20% by weight, particularly preferably from 3 to 15% by weight. These polypropylene-based polymers may be composed of two or more polymers together. As indices of the crystalline property of polypropylene, the melting point, the crystal melting calorie and the like are used for example. It is preferable that the melting point is in the range from 120° C. to 176° C. and the crystal melting calorie is in the range from 60 J/g to 120 J/g. When the melting point of a crystal is too low or the melting calorie thereof is too low, heat resistance of the raw material may decrease consequently.

For producing a polyolefin-based resin, there may be generally listed methods in which a propylene homopolymer is obtained by homopolymerizing propylene in one-step or multistep process according to slurry polymerization, gas-phase polymerization, bulk polymerization, solution polymerization or combination thereof using a Ziegler Natta type catalyst comprising a titanium-containing solid state transition metal component and an organometal component, or a metallocene catalyst comprising a transition metal compound of 4A to 6A groups in the periodic table having at least one cyclopentadienyl skeleton and an auxiliary catalyst component, or in which a propylene • α-olefin copolymer is obtained by copolymerizing propylene with an a α-olefin having 2 or 4 to 12 carbon atoms, preferably ethylene in a one-step or multi-step process. Further, corresponding commercially available products can be used A polyolefin based resin composition which has excellent flexibility and transparency properties can be obtained by using the modifier of the present invention.

For obtaining the modified polyolefin-based resin composition, the modifier for a polyolefin-based resin of the present invention may be compounded into a polyolefin-based resin. The amount compounded of the modifier is from 3 to 95% by weight, preferably from 10 to 80% by weight, more preferably from 30 to 70% by weight. When the amount compounded is too low, the modifying effect may be insufficient. On the other hand, when the amount is too high, the flowability of the composition may be lower, the molding proccessability may be poor, the strength may be lacking, and the heat resistance may be poor.

The modified polyolefin based resin composition of the present invention can be used optimally electric household appliances, automobile parts, general merchandise and the like by utilizing excellent features thereof. In automobile parts, it can be suitably applied to surfaces of interiors such as an inner panel door, pillar and the like, and an air bag cover and the like.

As described above, according to the present invention, the present technology provides a polyolefin-based resin composition having excellent flexibility and transparency, while suppressing mutual adhesion of resin composition pellet used in compounding to impart the flexibility and transparency. Hence it has excellent handling and workability properties. This technology also provides a resin composition pellet having the above-described features, as well as a method for producing the resin composition pellet, a modifier for a polyolefin-based resin and a method for producing a polyolefin-based resin composition.

EXAMPLES

The present invention will be illustrated by the following examples.

(1) Measurements were conducted according to the following methods.

The intrinsic viscosity [η] was measured by using a Ubbelohde viscometer in tetralin at 135° C. 300 g of the sample was dissolved in 100 ml of tetralin to prepare a solution of 3 mg/ml. This solution is further diluted to ½, ⅓ and ⅕, and the resulting solutions were respectively subjected to measurement in a constant temperature oil bath at 135° C. (±0.1° C.). The measurement was repeated three tunes at respective concentrations, and the resultant values were averaged.

The differential scanning calorimetry (DSC) measurement was conducted at a rate of 10° C./min in any of the temperature increasing process and temperature decreasing process using a differential scanning calorimeter model DSC220C manufactured by Seiko Denshi Kogyo K.K.

The measurement of each monomer unit content in the copolymer starts with a calibration curve preparation. Mixtures of various mixing rations composed of a propylene homopolymer and ethylene-1-butene copolymer were respectively heat-pressed to from films having a thickness of 0.05 mm Absorbancy was measured at propylene unit derived peak (wave number 115 cm$^{-1}$) and 1-butene unit-derived peak (wave number 770 cm$^{-1}$) using an infrared spectrometer, and the contents of the propylene and 1-butene units in this mixture were plotted against this absorbancy. From these plots, a regression curve was obtained as a calibration curve. The propylene homopolymer and the mixture of the ethylene-1-butene copolymer were dissolved in toluene, and methanol was added-to the mixture, and the resultant precipitate was dried to be used. The measurement of propylene/1-butene content involved heat-pressing an olefin copolymer to form films having a thickness of 0.05 mm, then measuring absorbancy at a propylene unit-derived peak and a 1-butene unit-derived peak using an infrared spectrometer. The contents of the propylene and 1-butene units were calculated based on the calibration curbed obtained by the above-described method. The measurement of dicyclopentadiene (DCPD) content involved heat-pressing an olefin copolymer to form films having a thickness of 0.5 mm, then measuring the dicyclopentadiene-derived (wave number 1611 cm$^{-1}$) peak transmittance using an Eared spectrometer, and content dicyclopentadiene in the olefin copolymer was calculated.

The hardness is measured according to ASTM D2240.

The bending test is conducted according to JIS K7203.

The haze measurement was conducted using a pressed sheet having a thickness of 2 mm according to JIS K7105.

(II) Preparation of Polymerization Catalyst
(1) Synthesis of transition metal complex:
(dimethylsilyl(tetramethylcyclopentadienyl) (3-tert-butyl5-methyl-2-phenoxy)titanium dichloride)
(a) Synthesis of 1-bromo-3-tert-butyl-5-methyl-2-phenol Under nitrogen atmosphere, 20.1 g (123 mmol) of 2-tert-butyl-4-methylphenol was dissolved in 150 ml of toluene in a 500 ml 4-necked flask equipped with a stirrer, then, to this was added 25.9 ml (18.0 g, 246 mmol) of tert-butylamine. This solution was cooled to −70° C., and to this was added 10.5 ml (32.6 g, 204 mmol) of bromine. This solution was kept at −70° C., and stirred for 2 hours. Then, the solution was allowed to warm to room temperature, and washed three times by adding 10% dilute hydrochloric acid in an amount of 100 ml per wash. After washing, the resulted organic layer was dried using anhydrous sodium sulfate, and the solvent was removed using an evaporator, then, it was purified using a silica gel column to obtain 18.4 g (75.7 mmol) of 1-bromo-3-tert-butyl-5-methyl-2-phenol as colorless oil. Yield was 62%.

(b) Synthesis of 1-bromo-3-tent-butyl-2-methoxy-5methylbenzene

Under nitrogen atmosphere, 13.9 g (57.2 mmol) of 1-bromo-3-tert-butyl-5-methyl-2-phenol synthesized in the above-described procedure (1) was dissolved in 40 ml of acetonitrile in a 100 ml 4-necked flask equipped with a stirrer, then, to this was added 3.8 g (67.9 mmol) of potassium hydroxide. Further, 17.8 ml (40.6 g, 286 mmol) of methyl iodide was added, and the mixture was stirred for 12 hours. Then, the solvent was removed using an evaporator, then, 40 ml of hexane was added to the residue and hexane-soluble components were extracted. The extraction was repeated three times. The solvent was removed from the extracted fraction to obtain 13.8 g (53.7 mmol) of 1-bromo-3-tert-butyl-2methoxy-5-methylbenzene as pale yellow oil. Yield was 94%.

(c) Synthesis of (3-tert-butyl-2-methoxy-5methylphenyl) chlorotrimethylsilane

To a solution composed of tetrahydrofuran (31.5 ml), hexane (139 ml) and 1-bromo-3-tert-butyl-2-methoxy-5-methylbenzene (45 g) synthesized in the above-described procedure (2) was added a 1.6 mol/liter hexane solution (115 ml) of n-butyllithium dropwise at −40° C. over 20 minutes. The resultant mixture was kept at −40° C. for 1 hour, and tetrahydrofuran (31.5 ml) was then added dropwise. To a solution composed of dichlorodimethylsilane (131 g) and hexane (306 ml) was added the above-described mixture dropwise at −40° C. The resultant mixture was allowed to warm to room temperature over 2 hours, and further stirred at room temperature for 12 hours. The solvent and excess dichlorodimethylsilane were removed under reduced pressure from the reaction mixture, hexane-soluble components were extracted from the residue with hexane, and the solvent was distilled off from the resultant hexane solution to obtain 41.9 g of (3-tert-butyl-2-methoxy-5-methylphenyl) chlorodimethylsilane as a pale yellow oil. Yield was 84%.

(d) Synthesis of (3-tert-butyl-2-methoxy-5-methylphenyl) dimethyl(tetramethylcyclopentadienyl)silane To a solution composed of (3-tert-butyl-2-methoxy-5-methylphenyl)chlorodimethylsilane (5.24 g) synthesized in the above-described procedure (c) and tetrahydrofuran(50 ml) was added tetramethylcyclopentadienyllithium (2.73 g) at −35° C., and the mixture was allowed to warm to room temperature over 2 hours, and further stirred at room temperature for 10 hours.

Then, the solvent was removed from the resultant reaction mixture under reduced pressure, and hexane-soluble components were extracted with hexane, and the solvent was distilled off from the resultant hexane solution under reduced pressure. The product yield was 97%. The product was a yellow oil (3-tert-butyl-2-methoxy-5-methylphenyl) dimethyl(tetramethylcyclopentadienyl)silane (6.69 g).

(e) Synthesis of dimethylsilyl (tetramethylcyclopentadienyl) (3-tert-butyl5-methyl-2-phenoxy)titanium chloride To a solution composed of (3-tert-butyl-2-methoxy5-methylphenyl) dimethyl(tetramethylcyclopentadienyl) silane (10.04 g) synthesized in the above-described procedure (d), toluene (100 ml) and triethylamine (6.30 g) was added a 1.63 mol/liter hexane solution (19.0 ml) of n-butyllithium dropwise at −70° C., then, the mixture was allowed to warm to room temperature over 2 hours, and further kept at room temperature for 12 hours.

Under nitrogen atmosphere, to a toluene solution (50 ml) of titanium tetrachloride (4.82 g) was added the mixture obtained above dropwise, the mixture was then allowed to warm to room temperature over 1 hour, then, the mixture was heated under reflux for 10 hours.

The reaction nature was filtered, the solvent was distilled off from the distillate, and the residue was re-crystallized from a toluene-hexane mixed solvent to obtain 3.46 g of dimethylsilyl(tetramethylcyclopentadienyl (3-tert-butyl-5-methyl-2-phenoxy)titanium chloride in the form of an orange prismatic crystal Yield was 27%.

The spectrum data obtained was as follows.

$^1$H-NMR(CDCl$_3$) δ 0.57(s, 6H), 1.41(s, 9H), 2.15(s, 6H), 2.34(s, 6H), 2.38(s, 3H), 7.15(s, 1H), 7.18(s, 1H).
$^{13}$C-NMR(CDCl$_3$) δ 1.25, 14.48, 16.28,22.47, 31.25, 36.29, 120.23, 130.62, 131.47, 133.86, 135.50, 137.37, 140.82, 142.28, 167.74, Mass spectrum (Cl m/e)458.

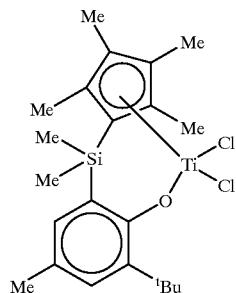

(III) Polymerization of Olefin-based Copolymer

Example 1

Copolymerization of ethylene, propylene and 1-butene was conducted continuously using a 100 L polymerization vessel made of stainless steel equipped with a string blade. Hexane was continuously supplied as a polymerization solvent at the lower part of the polymerization vessel at a rate of 83 L/hour. The polymerization solution was extracted from the upper part of the polymerization vessel continuously so that the amount of the polymerization solution in the polymerization vessel was maintained at 100 L.

Dimethylsilyl(tetramethylcyclopentadienyl)(3-tert-butyl-methyl-2-phenoxy) titanium dichloride, triphenylmethyltetrakis(pentafluorophenyl)borate and tri-isobutylaluminum were continuously supplied as a catalyst into the polymerization vessel at the lower part of the polymerization vessel at rates of 0.018 g/hour, 0.276 g/hour and 1.584 g/hour respectively. Further, hydrogen was used to control molecular weight. The copolymerization reaction was conducted at 50° C. by allowing cooling water to circulate through a jacket installed on the outer part of the polymerization vessel. To the polymerization solution extracted from the polymerization vessel was added a small amount of ethanol to stop the polymerization reaction, the monomers were removed and the solution was washed with water, then, the solvent was removed by steam in a large amount of water to take out a copolymer which was dried under reduced pressure at 80° C. over day and night. By the above-described procedure, an ethylene-propylene-1-butene copolymer was obtained at a rate of 6.12 kg/hour. The conditions and results are shown in Table 1.

Example 2

Copolymerization of ethylene, propylene and 1-butene was conducted continuously using a 100 L polymerization vessel made of stainless steel equipped with a stirring blade. Namely, hexane was continuously supplied as a polymerization solvent at the lower part of the polymerization vessel at a rate of 83 L/hour. On the other hand, the polymerization solution was extracted from the upper part of the polymerization vessel continuously so that the amount of the polymerization solution in the polymerization vessel was maintained at 100 L.

Dimethylsilyl(tetramethylcyclopentadienyl)(3-tert-butyl5-methyl-2-phenoxy)titanium dichloride, triphenylmethyltetrakis(pentafluorophenyl.)borate and tri-isobutylaluminum were continuously supplied as a catalyst into the polymerization vessel at the lower part of the polymerization vessel at rates of 0.045 g/hour, 0.827 g/hour and 2.376 g/hour respectively. Further, hydrogen was used to control molecular weight. The copolymerization reaction was conducted at 50° C. by allowing cooling water to circulate, through a jacket installed on the outer part of the polymerization vessel. To the polymerization solution extracted from the polymerization vessel was added a small amount of ethanol to stop the polymerization reaction, the monomers were removed and the solution was washed with water, then, the solvent was removed by steam in a large amount of water to take out a copolymer which was dried under reduced pressure at 80° C. over day and night. By the above-described procedure, an ethylene-propylene-1-butene copolymer was obtained at a rate of 5.16 kg/hour. The conditions and results are shown in Table 1.

TABLE 1

|  |  | Example 1 | Example 2 |
|---|---|---|---|
| Polymerization temperature | ° C. | 50 | 50 |
| Ethylene | Kg/h | 2 | 2 |
| Propylene | Kg/h | 8.3 | 8.3 |
| i-Butene | Kg/h | 12.7 | 12.7 |
| *1 DCPD | Kg/h | 0 | 1.04 |
| *2 (a) | g/h | 1.584 | 2.376 |
| *3 (b) | g/h | 0.276 | 0.827 |
| *4 (c) | g/h | 0.018 | 0.045 |
| Ethylene content | mol % | 11 | 10 |
| Propylene content | mol % | 40 | 39 |
| 1-Butene content | mol % | 49 | 50 |
| DCPD content | mol % | 0 | 1 |
| Crystal melting point | ° C. | none | none |
| Crystal melting calorie | mj/mg | none | none |
| Crystallization temperature | ° C. | none | none |
| Crystallization calorie | mj/mg | none | none |
| Intrinsic viscosity [η] | dl/g | 0.94 | 0.86 |

*1 DCPD: dicyclopentadiene
*2 (a): triisobutylaluminum
*3 (b): triphenylmethyltetrakis(pentafluorophenyl)borate
*4 (c): dimethylsilyl(tetramethylcyclopentadienyl)(3-tert-butyl-5-methyl-2-phenoxy)titanium dichloride (IV) Production of Resin Composition Pellet Example 3, Comparative Example 1

Pellets were produced from the compositions shown in Table 2. The compositions shown in Table 2 were kneaded previously using Plasticoder PLV151 type manufactured by Blabender Corp. at a temperature of 200° C. and a screw rotation of 10 rpm for 2 minutes and then kneaded at 80 rpm for 5 minutes. The compositions were pressed at 200° C. to give sheets having a thickness of 4 mn These sheets were cut by Sheet Pelletizer GHP-220 manufactured by Hourai Tekkousho K.K to give square pellets of about 4 mm square respectively.

The mutual adhesion was evaluated as follows. 40 g of the above described pellet was placed on a 200 ml beaker, a 2 mm thick teflon sheet was placed so as to cover all of the upper portion, and a load was applied with a 1 kg weight, left in a constant temperature chamber at 70° C. for 8 hours, and then allowed to cool to room temperature.

The mutual adhesion of the pellet taken out from the beaker was judged according to the following standard. The results are shown in Table 2.

O: no mutual adhesion, and a grain is separate from another grain

X: adheres mutually, and separation is difficult

TABLE 2

|  | Unit | Example 3 | Comparative example 1 |
|---|---|---|---|
| Copolymer of Example 1 | wt % | 80 | 90 |
| Polypropylene-based resin | wt % | 20 | 10 |
| Evaluation result of mutual adhesion | Judgement | ○ | x |

Polypropylene-based resin: Homopolypropylene having a MI of 14 (g/10 min) at 230° C. and 2.16 kg load.

(V) Production of a Polyolefin-based Resin Composition

Example 4 and Comparative Example 1

The compositions shown in Table 3 were knelled previously using a Plasticorder PLV151 type manufactured by Blabender Corporation at a temperature of 200° C. and a screw rotation of 10 rpm for 2 minutes, and then kneaded for 5 minutes at a screw rotation of 80 rpm. The compositions were pressed at 200° C. to give sheets having a thickness of 2 mm. Samples were cut out from the pressed sheet and physical properties were measured.

TABLE 3

| Copolymer | Unit | Example 4 | Comparative example 2 |
|---|---|---|---|
| Composition of Example 2 | wt % | 50 | 0 |
| Polypropylene-based resin | wt % | 50 | 100 |
| Hardness Shore A |  | 82.2 | 96.2 |
| Shore D |  | 45.5 | 65.4 |
| Bending modulus | Kgf/cm$^2$ | 1320 | 7200 |
| Haze (2 mmt) | % | 72.0 | 85.8 |

Polypropylene-based resin: Ethylene-propylene random copolymer containing ethylene in an amount of 5% by weight, having a MI of 228 (g/10 min) at 230° C. and 2.16 kg load.

What is claimed is:

1. A resin composition pellet comprising:
   (i) 15 to 65% by weight of a polyolefin-based resin, and
   (ii) 85 to 35% by weight of an olefin-based copolymer obtained by copolymerizing a cyclic olefin and two or more olefins selected from ethylene, propylene and α-olefins having 4 to 20 carbon atoms in the presence of a catalyst for olefin polymerization, the total number of carbon atoms in the selected olefins being 7 or more, wherein
   the content of said cyclic olefin is from 0.01 to 20 mol %,
   the cyclic olefin is a cyclic monoolefin, or
   the cyclic olefin is a cyclic polyene.

2. The resin composition pellet according to claim 1, wherein the copolymer (ii) has an ethylene content of 80 mol % or less.

3. The resin composition pellet according to claim 1, wherein the copolymer (ii) satisfies the following formula:

$$[y/(x+y)] \geq 0.2$$

(wherein, x represents the mol content of ethylene in the copolymer, and y represents the mol content of the α-olefins having 4 to 20 carbon atoms in the copolymer.).

4. The resin composition pellet according to claim 1, wherein the copolymer (ii) has an intrinsic viscosity [η] measured by using a tetralin solvent at 135° C. of 0.3 to 10.

5. The resin composition pellet according to claim 1, wherein the copolymer (ii) has neither peak of 1 J/g or more based on crystal melting nor peak of 1 J/g or more based on crystallization in measurement by differential scanning calorimetry (DSC).

6. The resin composition pellet according to claim 1, wherein the copolymer (ii) is an olefin-based copolymer obtained by copolymerizing a cyclic olefin and two or more olefins selected from ethylene, propylene and α-olefins having 4 to 20 carbon atoms in the presence of a catalyst for olefin polymerization, the total number of carbon atoms in the selected olefins being 7 or more.

7. The resin composition pellet according to claim 1, wherein the content of the cyclic olefin is from 0.01 to 20 mol %.

8. The resin composition pellet according to claim 1, wherein the cyclic olefin is a cyclic monoolefin.

9. The resin composition pellet according to claim 1, wherein the cyclic olefin is a cyclic polyene.

10. The resin composition pellet according to claim 1, wherein the catalyst for olefin polymerization comprises a transition metal complex of 4A to 6A group in the periodic table, said complex having at least one cyclopentadienyl skeleton.

11. The resin composition pellet according to claim 1, wherein the catalyst for olefin polymerization comprises a transition metal complex of 4A to 6A group in the periodic table, said complex being non-stereospecific structure.

12. The resin composition pellet according to claim 1, wherein one or more of inorganic or organic fine powders are dusted on the surface of the pellet.

13. The resin composition pellet according to claim 1, wherein one or more of calcium carbonate, barium sulfate, silica, talc, stearic acid and polyolefin in powder are dusted on the surface of the pellet.

14. The resin composition pellet comprising:
(i) 15 to 65% by weight of a polyolefin-based resin, and
(ii) 85 to 35% by weight of an olefin-based copolymer obtained by copolymerizing a cyclic olefin and two or more olefins selected from ethylene, propylene and α-olefins having 4 to 20 carbon atoms in the presence of a catalyst for olefin polymerization, the total number of carbon atoms in the selected olefins being 7 or more, wherein
the content of said cyclic olefin is from 0.01 to 20 mol %,
the cyclic olefin is a cyclic monoolefin, or
the cyclic olefin is a cyclic polyene,
wherein a polyolefin powder having an average particle size of 500 μm or less is dusted on the surface of the pellet.

15. The resin composition pellet according to claim 1, wherein the resin (i) is a propylene-based resin.

16. The resin composition pellet according to claim 1, wherein the catalyst for olefin polymerization is a catalyst for olefin polymerization obtained by using the following compounds (A), (B) and/or (C):
(A): at least one transition metal complex represented by the following formula (I), (II) or (III):

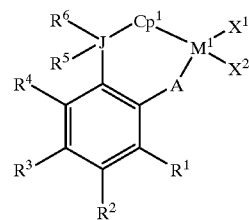

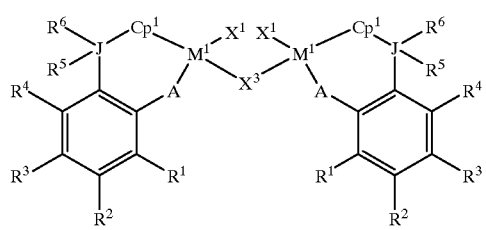

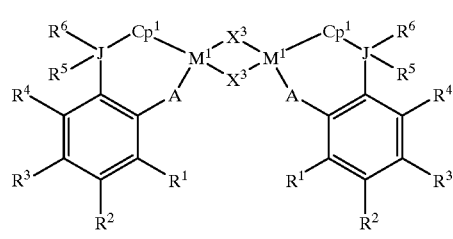

wherein $M^1$ represents a transition metal atom of group IV in the Periodic Table of the Elements; A represents an atom of group XVI in the Periodic Table of the Elements; J represents an atom of group XIV in the Periodic Table of the Elements; $Cp^1$ represents a group having a cyclopentadiene type anion skeleton; $X^1$, $X^2$, $R^1$, $R^2$, $R^3$, $R^4$, $R^5$, and $R^6$ independently represent a hydrogen atom, a halogen atom, an alkyl group, an aralkyl group, an aryl group, a substituted silyl group, an alkoxy group, an aralkyloxy group, an aryloxy group, or a disubstituted amino group; and $R^1$, $R^2$, $R^3$, $R^4$, $R^5$, and $R^6$ may be combined optionally to form a ring,
$X^3$ represents an atom of group XVI in the Periodic Table of Elements, and
two of $M^1$, A, J, $Cp^1$, $X^1$, $X^2$, $X^3$, $R^1$, $R^2$, $R^3$, $R^4$, $R^5$, and $R^6$ may be the same or different;
(B) one or more of aluminum compounds selected from the following (B1)–(B3):
(B1) an organoaluminum compound represented by the general formula $E^1{}_a AlZ_{3-a}$,
(B2) a cyclic aluminoxane represented by the general formula $\{-Al(E^2)-O-\}_b$ and
(B3) a linear aluminoxane represented by the general formula $E^3\{-Al(E^3)-O-\}_c AlE^3{}_2$ wherein $E^1$, $E^2$ and $E^3$ respectively represent a hydrocarbon group and each of the $E^1$, $E^2$ and $E^3$ groups may be the same or different; Z represents a hydrogen atom or a halogen atom and each of the Z groups may be the same or different; a satisfies the equation 0<a≦3; b represents an integer of 2 or more; and c represents an integer of 1 or more;
(C) any one boron compound of the following (C1)–(C3):
(C1) a boron compound represented by the general formula $BQ^1Q^2Q^3$,
(C2) a boron compound represented by the general formula $G^+(BQ^1Q^2Q^3Q^4)^-$ and (C3) a boron compound represented by the general formula $(L-H)^+(BQ^1Q^2Q^3Q^4)^-$ wherein B represents a trivalent boron atom in the valence state; $Q^1$ to $Q^4$ may each be the same or different and represent a halogen atom, a hydrocarbon group, a halogenated hydrocarbon group, a substituted silyl group, an alkoxy group or a disubstituted amino group; $G^+$ is an inorganic or organic cation; L is a neutral Lewis base; and $(L-H)^+$ is a Bronsted acid.

17. The resin composition pellet according to claim 16, wherein A represents an oxygen atom.

18. The resin composition pellet according to claim 16, wherein $R^1$ represents an alkyl group, an aralkyl group, an aryl group or a substituted silyl group.

19. The resin composition pellet according to claim 16, wherein $X^1$ and $X^2$ each independently represents a halogen atom, an alkyl group, an aralkyl group, an alkoxy group, an aryloxy group or a disubstituted amino group.

20. The resin composition pellet according to claim 16, wherein the compound (B) is triethylaluminum, tributylaluminum or methylaluminoxane.

21. The resin composition pellet according to claim 16, wherein the compound (C) is dimethylaniliniumtetrakis (pentafluorophenyl)borate or triphenylmethyltetrakis (pentafluorophenyl)borate.

22. The resin composition according to claim 14, wherein the content of the cyclic olefin is from 0.01 to 20 mol %.

23. The resin composition according to claim 14, wherein the cyclic olefin is a cyclic monoolefin.

24. The resin composition according to claim 14, wherein the cyclic olefin is a cyclic polyene.

25. A method for producing a resin composition pellet comprising:
  (i) 15 to 65% by weight of a polyolefin-based resin, and
  (ii) 85 to 35% by weight of an olefin-based copolymer obtained by copolymerizing two or more olefins selected from ethylene, propylene and α-olefins having 4 to 20 carbon atoms in the presence of a catalyst for olefin polymerization, the total number of carbon atoms in the selected olefins being 7 or more wherein the resin (i) and the copolymer (ii) are kneaded at a temperature not lower than the maximum peak temperature (Tm) in measurement by differential scanning calorimetry (DSC) and not higher than 280° C.

26. A polyefin-based resin modifier comprising the polyolefin-based resin composition pellet according to claim 1.

27. A method for producing a polyolefin-based resin composition comprising compounding the polyolefin-based resin modifier according to claim 26 into a polyolefin-based resin.

* * * * *